United States Patent [19]

Yoshizaki et al.

[11] Patent Number: 5,597,951
[45] Date of Patent: Jan. 28, 1997

[54] INTAKE AIR AMOUNT-ESTIMATING APPARATUS FOR INTERNAL COMBUSTION ENGINES

[75] Inventors: Masuhiro Yoshizaki; Isao Komoriya; Shinichi Kitajima, all of Wako, Japan

[73] Assignee: Honda Giken Kogyo Kabushiki Kaisha, Tokyo, Japan

[21] Appl. No.: 607,866

[22] Filed: Feb. 27, 1996

[30] Foreign Application Priority Data

Feb. 27, 1995 [JP] Japan .................................. 7-038853
Feb. 27, 1995 [JP] Japan .................................. 7-038854

[51] Int. Cl.$^6$ .......................... F02D 45/00; G01M 15/00
[52] U.S. Cl. ........................................................... 73/118.2
[58] Field of Search .................................. 123/436, 478; 364/431.05; 73/116, 117.2, 117.3, 118.2, 227, 861

[56] References Cited

U.S. PATENT DOCUMENTS

| | | | |
|---|---|---|---|
| 4,984,456 | 1/1991 | Takahashi | 73/118.2 |
| 5,003,950 | 4/1991 | Kato et al. | 73/118.2 |
| 5,012,422 | 4/1991 | Takahashi et al. | 364/431.05 |
| 5,191,789 | 3/1993 | Furuya | 73/118.2 |
| 5,270,935 | 12/1993 | Dudek et al. | 73/118.2 |
| 5,293,553 | 3/1994 | Dudek et al. | 73/118.2 |
| 5,343,745 | 9/1994 | Tomisawa | 73/118.2 |
| 5,398,544 | 3/1995 | Lipinski et al. | 73/118.2 |
| 5,423,208 | 6/1995 | Dudek et al. | 73/117.3 |

FOREIGN PATENT DOCUMENTS 6-74076  3/1994  Japan .
7-42600  2/1995  Japan .

*Primary Examiner*—Richard Chilcot
*Assistant Examiner*—George M. Dombroske
*Attorney, Agent, or Firm*—Nikaido, Marmelstein, Murray & Oram LLP

[57] ABSTRACT

An intake air amount-estimating apparatus for an internal combustion engine estimates an amount Gc of intake air actually drawn into a combustion chamber, based on a model formulated on an intake passage in which a portion of the intake passage extending from a throttle valve to each of the combustion chamber is regarded as a chamber. A value Gc' of the intake air amount in a steady operating condition is determined at least based on engine rotational speed and pressure within the chamber. An effective opening area A of the throttle valve is determined at least based on throttle valve opening and the pressure within the chamber. A first-order delay value ADELAY of the effective opening area of the throttle valve is determined. The intake air amount value Gc' is corrected to calculate the amount Gc by an equation of Gc=Gc'×(A/ADELAY). The ADELAY value is calculated by the use of a correction value for use in calculating the ADELAY value, which is set in a manner depending on a detected change in the amount of air charged in the chamber.

12 Claims, 20 Drawing Sheets

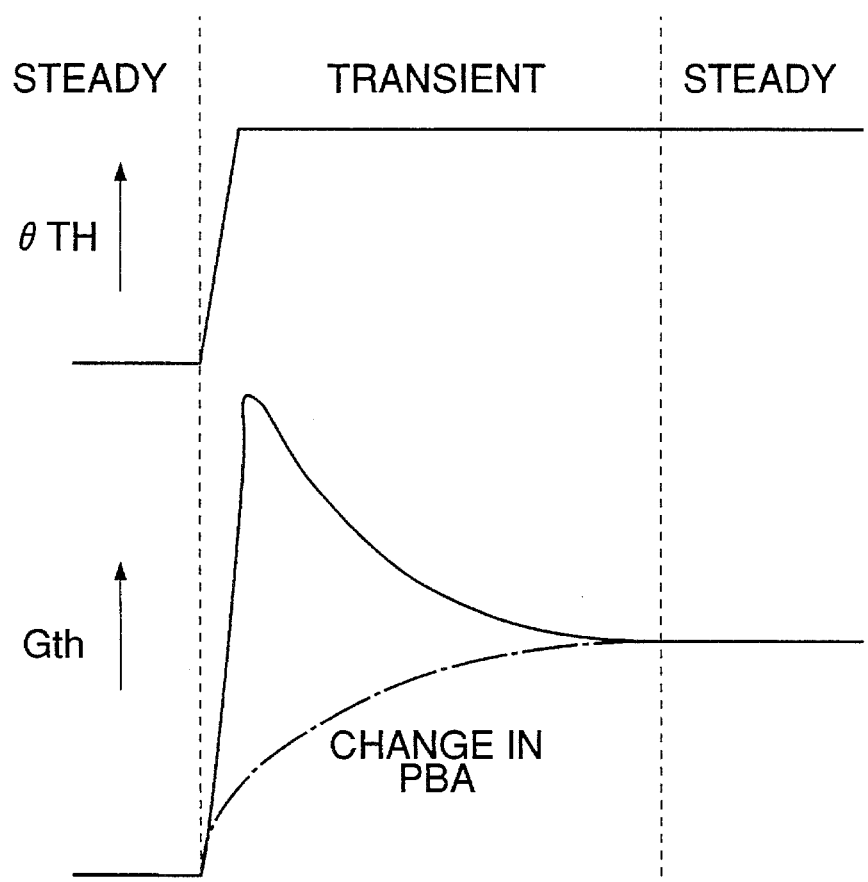

5,597,951

INTAKE AIR AMOUNT-ESTIMATING APPARATUS FOR INTERNAL COMBUSTION ENGINES

BACKGROUND OF THE INVENTION

1. Field of the Invention

This invention relates to an intake air amount-estimating apparatus for internal combustion engines, which estimates the amount of intake air drawn into the engine.

2. Prior Art

Recently, it has been proposed to estimate the amount of intake air drawn into an internal combustion engine by the use of equations based on a fluid dynamics model applied to the intake system of the engine. The present assignee has also proposed by Japanese Laid-Open Patent Publication (Kokai) No. 6-74076 a technique of this kind which determines the amount of intake air flowing through a throttle valve, which is considered as a restriction, from a pressure difference between upstream and downstream sides of the throttle valve by the use of a theoretical formula of a throttle-type flowmeter, and calculates an amount of intake air drawn into the cylinder based on the estimated amount of intake air.

However, such a fluid dynamics model is formulated on the assumption that the object (intake system of the engine in the present case) is in an ideal state, and it is difficult to accurately determine various constants, such as a specific heat, which were used in formulating the model, when the object is in an actual state. Further, the equations based on the fluid dynamics contain powers, roots, etc., requiring calculations of them. Therefore, approximate values are applied to the equations in actual calculations. For these reasons, it is impossible to completely eliminate errors in implementing the model on an actual object.

Therefore, it is still critically important to reduce the difference or error between the estimated amount of intake air drawn into the cylinder determined by the model and the actual amount of intake air drawn in the cylinder. To this end, the present assignee has proposed by Japanese Laid-Open Patent Publication (Kokai) No. 7-42600 a method which is based on the fluid dynamics model but can absorb errors in implementing the equations of the model to thereby obtain more accurate estimated values of the amount of intake air drawn into the cylinder without the need of complicated calculations and irrespective of whether the engine is in a transient operating condition, deterioration, aging or variations of component parts and elements of the engine.

All the proposed methods given above estimate the amount of intake air drawn into the cylinder, based on the degree of opening of the throttle valve. On the other hand, there can occur a phenomenon that even when the engine is in a steady operating condition, the throttle valve opening undergoes slight changes due to vibrations of the engine transmitted to a throttle body in which the throttle valve is mounted. If such changes in the throttle valve opening are detected and input to an intake air amount-estimating apparatus, the intake air amount is estimated to values corresponding to such changes. As a result, the actual operation of the engine is not stabilized in spite of the engine being in a steady operating condition, leading to degraded driveability of the engine. Moreover, the throttle valve opening θTH and the intake air amount Gc are in a relationship as shown in FIG. 25, which shows that a slight change in the throttle valve opening while the throttle valve assumes a small degree causes a large change in the intake air amount Gc, so that the intake air amount Gc is estimated to have largely changed. Therefore, there is a demand for stable and accurate estimation of the intake air amount, particularly when the throttle valve assumes a small degree of opening.

SUMMARY OF THE INVENTION

It is a first object of the invention to provide an intake air amount-estimating apparatus for an internal combustion engine, which is capable of estimating the amount of intake air drawn into the cylinder in a more accurate manner by reducing the difference between an estimated amount of intake air drawn into each cylinder calculated from a fluid dynamics model of the intake system of the engine and an actual amount of intake air drawn into the cylinder.

It is a second object of the invention to provide an intake air amount-estimating apparatus for an internal combustion engine, which is capable of maintaining the accuracy of estimation of the amount of intake air drawn into the engine even when the engine is in a steady operating condition to thereby stabilize a traveling condition of an automotive vehicle on which the engine is installed.

To attain the first object, according to a first aspect of the invention, there is provided an intake air amount-estimating apparatus for an internal combustion engine having an intake passage, a throttle valve arranged in the intake passage, and at least one combustion chamber, the intake air amount-estimating apparatus estimating an amount Gc of intake air actually drawn into each of the at least one combustion chamber of the engine, based on a model formulated on the intake passage in which a portion of the intake passage extending from the throttle valve to each of the at least one combustion chamber is regarded as a chamber.

The intake air amount-estimating apparatus according to the first aspect of the invention is characterized by comprising:

operating condition-detecting means for detecting operating parameters of the engine including rotational speed of the engine, a degree of opening of the throttle valve, and pressure within the chamber;

intake air amount value-determining means for determining a value Gc' of the amount of intake air in a steady operating condition of the engine, at least based on the rotational speed of the engine and the pressure within the chamber detected by the operating condition-detecting means;

effective opening area-determining means for determining an effective opening area A of the throttle valve, at least based on the degree of opening of the throttle valve and the pressure within the chamber detected by the operating condition-detecting means;

first-order delay value-determining means for determining a first-order delay value ADELAY of the effective opening area of the throttle valve; and intake air amount value-correcting means for correcting the value Gc' of the amount of intake air in the steady operating condition of the engine by a ratio of the effective opening area A of the throttle valve to the first-order delay value ADELAY of the effective opening area of the throttle valve by the use of the following equation:

$$Gc = Gc' \times (A/ADELAY)$$

to thereby calculate the amount Gc of intake air actually drawn into the each of the at least one combustion chamber, wherein the first-order delay value-calculating means comprises:

change-detecting means for detecting a change in an amount of air charged in the chamber;

setting means for setting a correction value for use in calculating a first-order delay value of the degree of opening of the throttle valve, in a manner depending on the change in the amount of air charged in the chamber detected by the change-detecting means; and calculating means for calculating the first-order delay value of the effective opening area by the use of the correction value set by the setting means.

Preferably, the setting means sets the correction value in manners depending on whether the amount of air charged in the chamber increases or decreases.

Preferably, the setting means sets, as the correction value, a correction coefficient B for determining a first-order transfer function of the degree of opening of the throttle valve, depending on the direction of the change in the amount of air charged in the chamber, the calculating means setting the first-order transfer function based on the correction coefficient B set by the setting means, calculating the first-order delay value of the degree of opening of the throttle valve based on the set first-order transfer function, and calculating the first-order delay value ADELAY of the effective opening area based on the calculated first-order delay value of the degree of opening of the throttle valve and the pressure within the chamber.

Preferably, the change-detecting means detects the change in the amount of air charged in the chamber from a change in the degree of opening of the throttle valve, the setting means setting the correction coefficient to different values depending on whether the amount of air charged in the chamber increases or decreases.

Preferably, the engine has intake valves and exhaust valves, the intake passage having an intake manifold, the change-detecting means detecting the change in the amount of air charged in the chamber based on at least one of a change in a volume of the intake manifold, a change in valve timing of at least one of the intake valves and the exhaust valves of the engine, a change in atmospheric pressure, a change in a desired air-fuel ratio to which an air-fuel ratio of a mixture supplied to the engine is controlled.

More preferably, the engine has intake valves and exhaust valves, the operating condition-detecting means also detecting valve timing of at least one of the intake valves and the exhaust valves of the engine, atmospheric pressure, intake air temperature, and a desired air-fuel ratio to which an air-fuel ratio of a mixture supplied to the engine is controlled, the setting means setting the correction coefficient to different values further depending on the valve timing, and correcting the correction coefficient according to at least one of the valve timing of the intake valves and the exhaust valves of the engine, the atmospheric pressure, the intake air temperature, and the desired air-fuel ratio.

To attain the second object, according to a second aspect of the invention, there is provided an intake air amount-estimating apparatus for an internal combustion engine having an intake passage, a throttle valve arranged in the intake passage, and at least one combustion chamber, the intake air amount-estimating apparatus estimating an amount Gc of intake air actually drawn into each of the at least one combustion chamber of the engine, based on a model formulated on the intake passage in which a portion of the intake passage extending from the throttle valve to each of the at least one combustion chamber is regarded as a chamber, the intake air amount-estimating apparatus.

The intake air amount-estimating apparatus according to the second aspect of the invention is characterized by comprising:

operating condition-detecting means for detecting operating parameters of the engine including rotational speed of the engine, a degree of opening of the throttle valve, and pressure within the chamber;

intake air amount value-determining means for determining a value Gc' of the amount of intake air in a steady operating condition of the engine, at least based on the rotational speed of the engine and the pressure within the chamber detected by the operating condition-detecting means;

effective opening area-determining means for determining an effective opening area A of the throttle valve, at least based on the degree of opening of the throttle valve and the pressure within the chamber detected by the operating condition-detecting means;

first-order delay value-determining means for determining a first-order delay value ADELAY of the effective opening area of the throttle valve;

effective opening area ratio-determining means for determining a ratio of the effective opening area A to the first-order delay value ADELAY of the effective opening area, as an effective opening area ratio RATIO-A;

intake air amount value-correcting means for correcting the value Gc' of the amount of intake air in the steady operating condition of the engine by multiplying the value Gc' of the amount of intake air by the effective opening area ratio RATIO-A by the use of the following equation:

$$Gc=Gc'\times RATIO\text{-}A$$

to thereby calculate the amount Gc of intake air actually drawn into the combustion chamber;

steady operating condition-determining means for determining whether the engine is in the steady operating condition; and changing means for changing the effective opening area ratio RATIO to a predetermined value when the steady operating condition-determining means determines that the engine is in the steady operating condition.

Preferably, the steady operating condition-determining means determines that the engine is in the steady operating condition when an amount of change in the degree of opening of the throttle valve per a predetermined time period is within a predetermined range.

More Preferably, the predetermined range of the amount of change in the degree of opening of the throttle valve is set according to the degree of opening of the throttle valve.

Preferably, the steady operating condition-determining means determines that the engine is in the steady operating condition when the effective opening area ratio RATIO-A is within a predetermined range close or equal to 1.0.

Preferably, the steady operating condition-determining means determines that the engine is in the steady operating condition when an amount of change in the pressure within the chamber per a predetermined time period is within a predetermined range.

More preferably, the predetermined range of the amount of change in the pressure within the chamber is set according to the rotational speed of the engine.

The above and other objects, features, and advantages of the invention will become more apparent from the following detailed description taken in conjunction with the accompanying drawings.

BRIEF DESCRIPTION OF THE DRAWINGS

FIG. 9A shows, by way of example, changes in the throttle valve opening θTH exhibited when the engine is in a transient operating condition and steady operating conditions;

FIG. 9B shows, by way of example, changes in the amount of intake air GTH flowing through the throttle valve exhibited when the engine is in a transient operating condition and steady operating conditions;

DETAILED DESCRIPTION

The invention will now be described in detail with reference to the drawings showing embodiments thereof.

Figure 1:
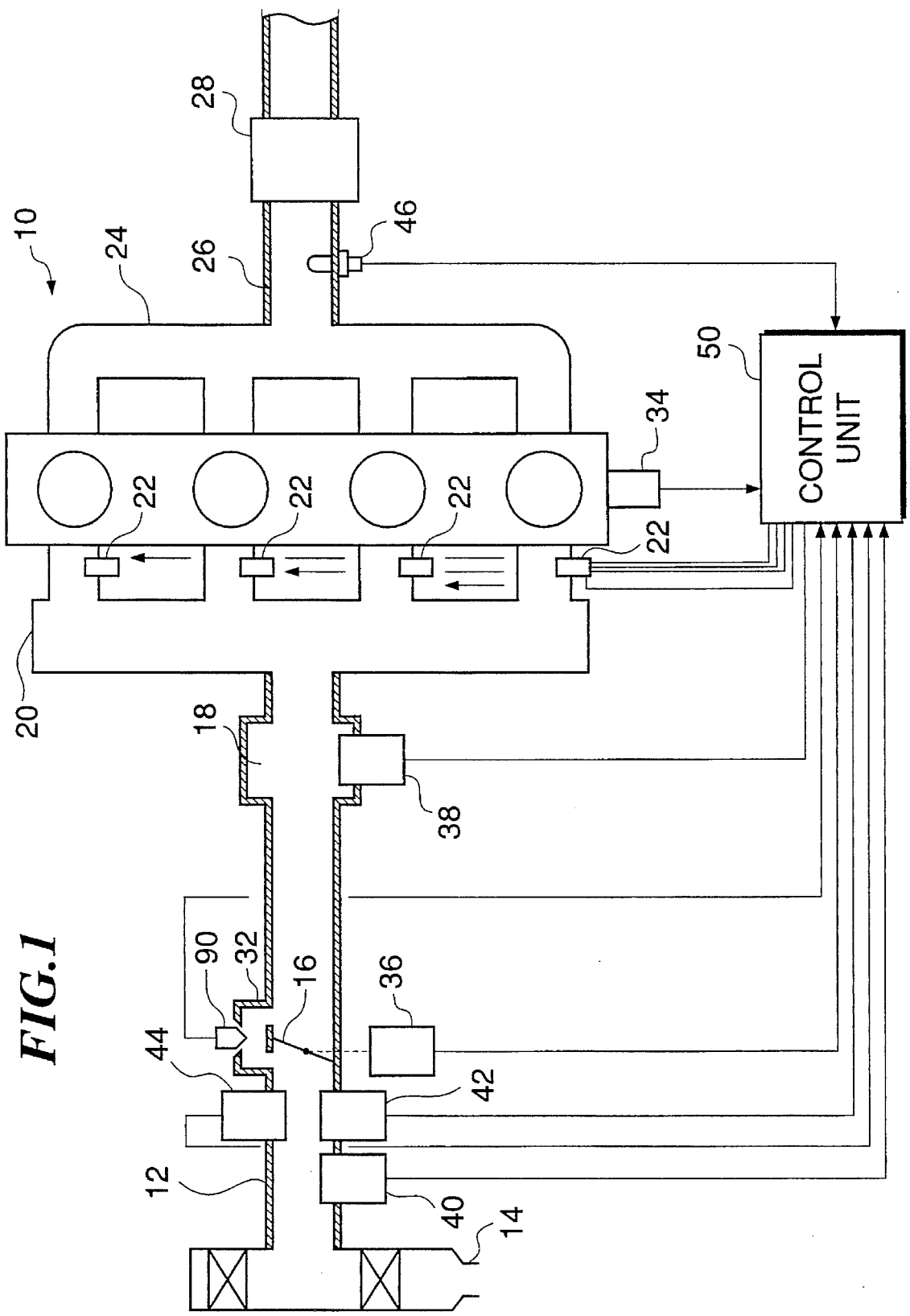
FIG. 1 is a block diagram showing the whole arrangement of an internal combustion engine incorporating an intake air amount-estimating apparatus therefor, according to a first embodiment of the invention.

Referring first to FIG. 1, there is shown the whole arrangement of an internal combustion engine and an intake air amount-estimating apparatus therefor, according to a first embodiment of the invention. In the figure, reference numeral 10 designates an internal combustion engine of a four-cylinder type (hereinafter simply referred to as "the engine"). Intake air is introduced into the engine 10 via an air cleaner 14 mounted on an open end of an intake pipe 12. A throttle valve 16 is arranged in the intake pipe 12 to control the flow rate of intake air to flow via a surge tank 18 and an intake manifold 20 into #1 to #4 cylinders. Fuel injection valves 22 are arranged in the intake pipe 2 at slightly upstream locations of intake valves, not shown, of the #1 to #4 cylinders, for injection of fuel therefor. A mixture of air and injected fuel is drawn into each cylinder, and fired by a spark plug for combustion to generate a force driving a piston received in the cylinder of the engine, none of which are shown. Exhaust gases resulting from the combustion are discharged via exhaust valves, not shown, into an exhaust manifold 24 and flow through an exhaust pipe 26 to the atmosphere after being purified by a three-way catalyst 28 arranged in the exhaust pipe 26.

A crank angle sensor 34 is arranged in a distributor, not shown, of the engine, for detecting a crank angle position of a piston. A throttle valve opening sensor 36 and an intake pipe absolute pressure PBA sensor 38 are arranged in the intake pipe, for detecting an opening θTH of the throttle valve 16 and pressure within the intake pipe 12 at a location downstream of the throttle valve 16 (pressure within "the chamber" defined hereinafter). At a location upstream of the throttle valve 16, there are also provided an atmospheric pressure sensor 40 for detecting atmospheric pressure PA, an intake air temperature sensor 42 for detecting the temperature of intake air TA, and a humidity sensor 44 for detecting the humidity of intake air. An auxiliary air passage 32 is provided in a fashion bypassing the throttle valve 16, for supplying secondary air to the engine, with an electromagnetic valve 90 arranged therein, which is driven by a signal from a control unit 50 to open or close the auxiliary air passage 32. In an exhaust system of the engine, a linear-output air-fuel ratio sensor 46 formed of an oxygen concentration-detecting element which has a wide range output characteristic is arranged at a location downstream of the exhaust manifold 24 and upstream of the three-way catalyst 28, for detecting the air-fuel ratio of exhaust gases. Signals indicative of values of parameters sensed by these sensors are supplied to the control unit 50.

Figure 2:
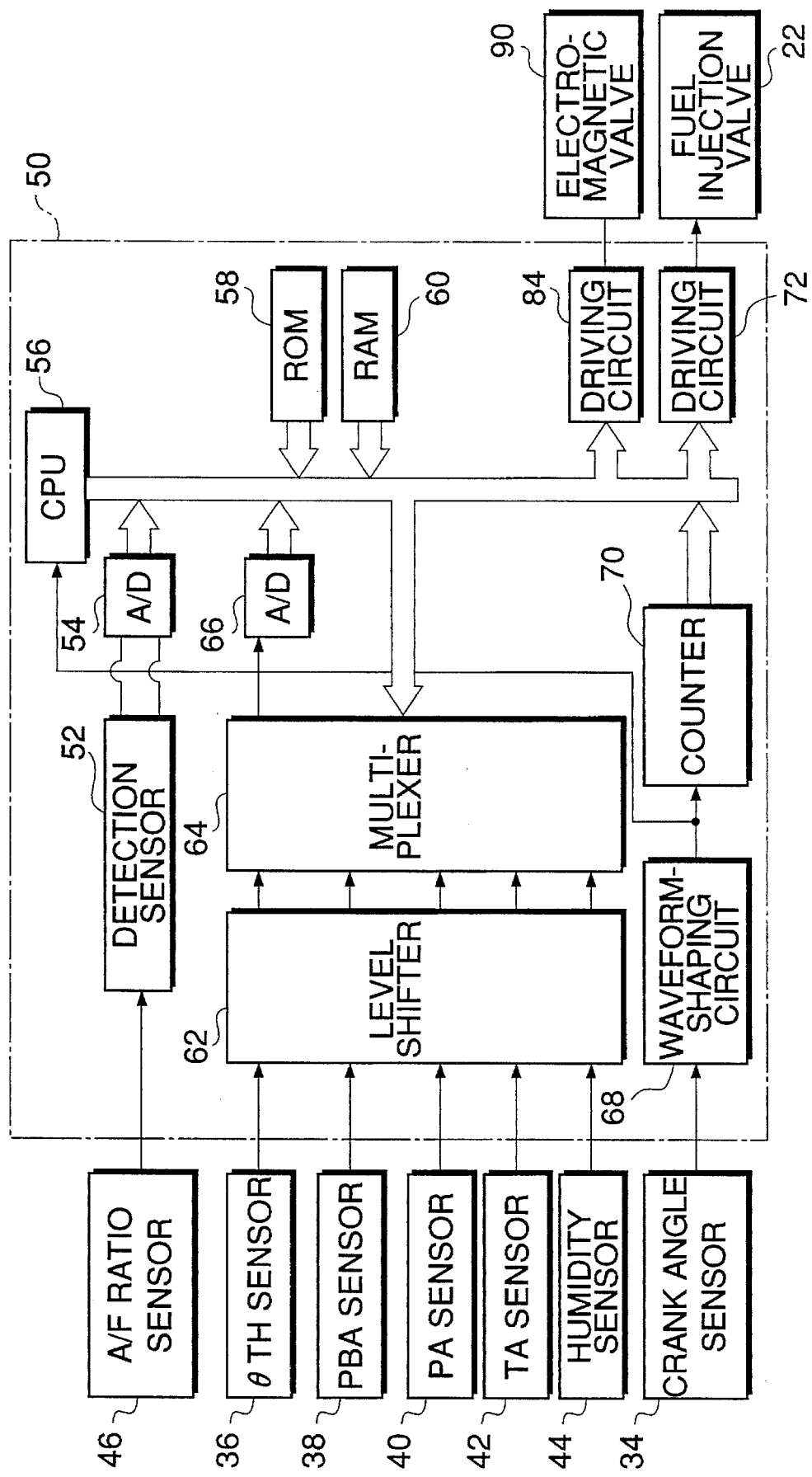
FIG. 2 is a block diagram showing the arrangement of a control unit and sensors appearing in FIG. 1.

FIG. 2 shows the arrangement of the control unit 50 and the sensors connected thereto. The output from the linear-output air-fuel ratio sensor 46 is supplied to a detection circuit 52 for detecting the air-fuel ratio A/F. The output from the detection circuit 52 is supplied via an analog-to-digital converter 54 to a microcomputer comprised of a CPU (central processing unit) 56, a ROM (read only memory) 58, and a RAM (random access memory) 60, and stored in the RAM 60. Similarly, analog signals from the throttle valve sensor 36, etc. are input to the microcomputer via a level shifter 62, a multiplexer 64, and a second analog-to-digital converter 66. An output signal from the crank angle sensor 34 is supplied to a waveform-shaping circuit 68 where the output signal is shaped into a rectangular waveform. Pulses of the rectangular waveform signal are counted by a counter 70 and the count of the counter 70 is delivered to the microcomputer. The CPU 56 of the microcomputer executes arithmetic operations of control amounts, referred to hereinafter, according to instructions of a program read from the ROM 58, and delivers driving signals to the fuel injection valves 22 via a driving circuit 72.

Now, an outline of the principle of the method of estimating the intake air amount based on the fluid dynamics model employed in the present embodiment will be described. This method is disclosed in Japanese Patent Application No. 6-197238.

Figure 3:
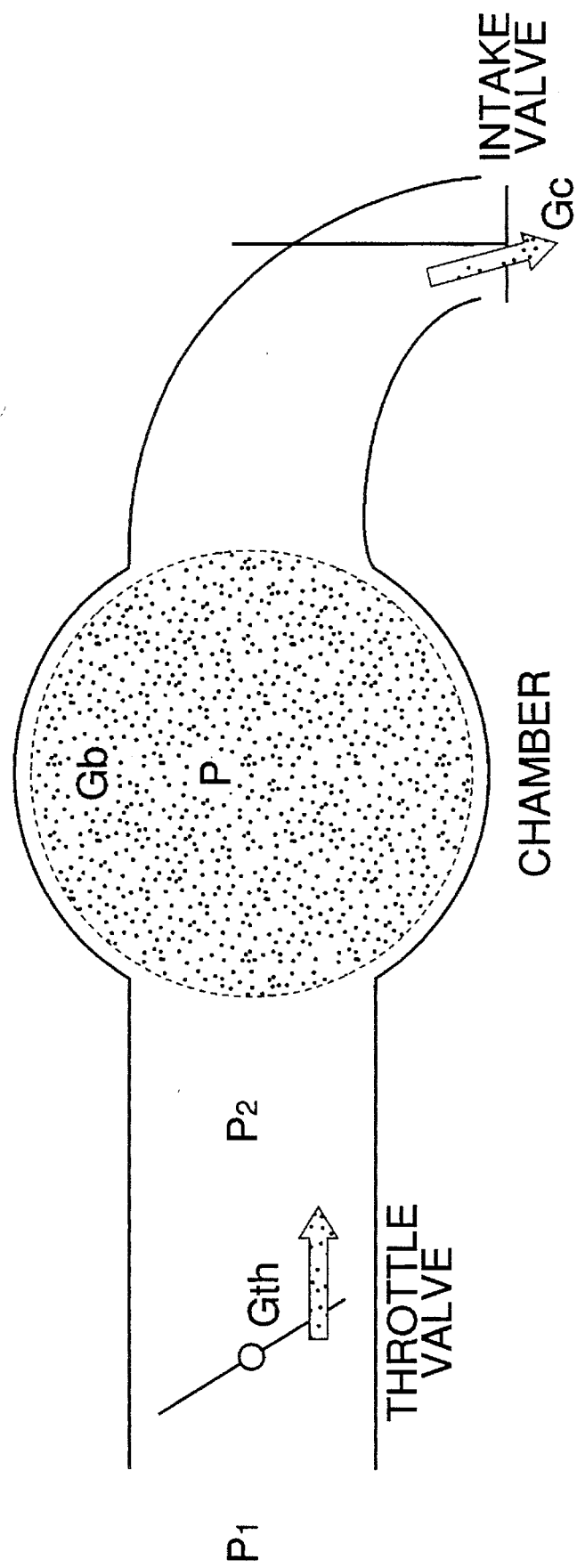
FIG. 3 is a diagram which is useful in explaining a fluid dynamics model adopted in the present embodiment.

According to this method, a model representative of the behavior of intake air flowing through the intake pipe of the engine is formulated by the use of physical equations (FIG. 3). The amount of air Gc drawn into the cylinder is estimated from the amount of air Gth flowing through the throttle valve and the amount of air Gb charged in the chamber. It should be noted that the "chamber" here includes not only a portion of the intake system corresponding to the surge tank, but also all portions of the intake system extending from the throttle valve to the intake port through which intake air flows into the cylinder. That is, the "chamber" means an effective volume actually acting as a chamber.

Figure 4:
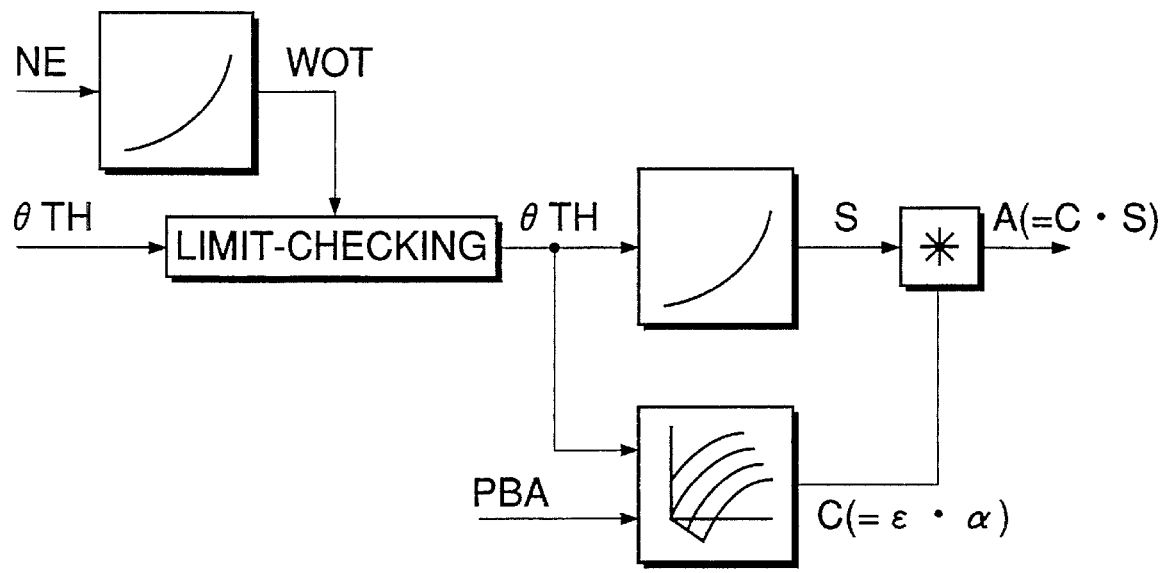
FIG. 4 is a block diagram which is useful in explaining a manner of calculating an effective opening area of a throttle valve, based on the fluid dynamics model by the use of flow rate coefficients, etc.
Figure 5:
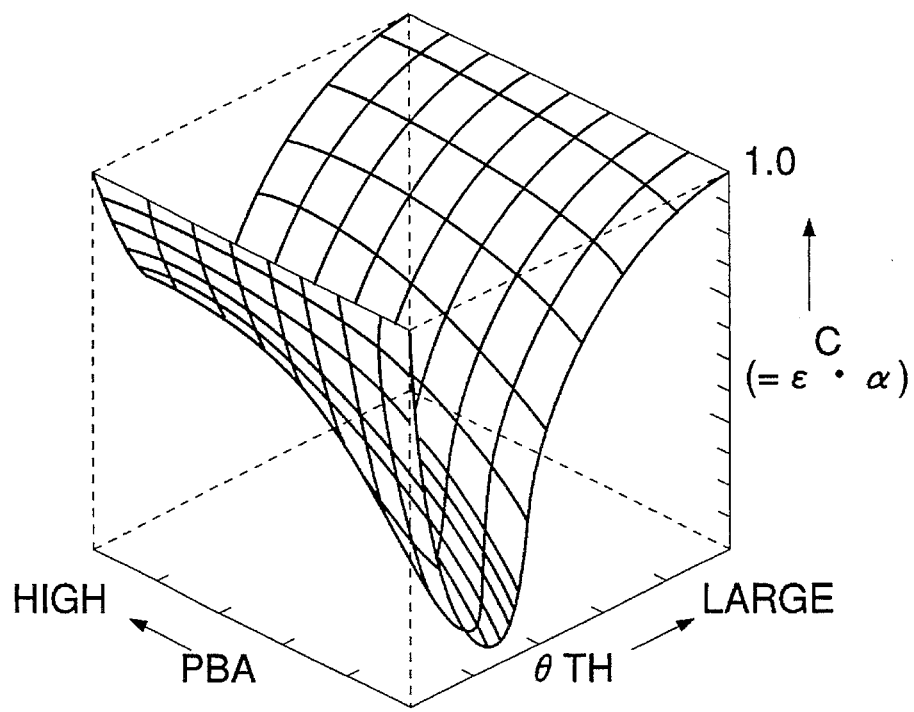
FIG. 5 is a diagram showing characteristics of a map of a coefficient applied to the calculation carried out in the manner shown in FIG. 4.

As shown in FIG. 4, a throttle projected area (area of opening of the throttle valve projected along the longitudinal axis of the intake pipe 12) S is determined from the throttle valve opening θTH according to characteristics set in advance according to the throttle valve opening θTH. Further, a correction coefficient C (the product of a flow rate coefficient α and a gas expansion correction coefficient ε) is determined according to characteristics set in advance according to the throttle valve opening θTH and the intake pipe absolute pressure (chamber internal pressure) PBA. The throttle projected area S is multiplied by the correction coefficient C to calculate the effective opening area A of the throttle valve applicable to steady operating conditions of the engine. In a so-called wide-open-throttle region where the throttle valve ceases to function as a restriction, limit values of the throttle valve opening θTH for the wide-open-throttle region are determined in advance according to different values of the engine rotational speed, and when the actual value of the throttle valve opening θTH exceeds the limit value corresponding to the present value of the engine rotational speed, the same limit value is adopted as the present value of the throttle valve opening θTH.

Then, the amount of air Gb within the chamber is calculated by the use of the following equation (1):

$$Gb(k)=(V/RT) \times P(k) \qquad (1)$$

where

V: volume of chamber;

R: gas constant;

T: intake air temperature;

P: pressure within chamber

Then, the amount of air ΔGb charged in the chamber in the present cycle is calculated from a change Δp in the pressure within the chamber detected in the present cycle by the use of the following equation (2):

$$\Delta Gb = Gb(k) - Gb(k-1) = (V/RT) \times (P(k) - P(k-1)) = (V/RT) \times \Delta P(k) \qquad (2)$$

Assuming that the amount of air charged in the chamber in the present cycle is naturally not drawn into the combustion chamber of the cylinder in the present cycle, the amount of air Gc drawn into the cylinder per unit time ΔT is expressed by the following equation (3):

$$Gc = Gth \times \Delta T - \Delta Gb \qquad (3)$$

Figure 6:
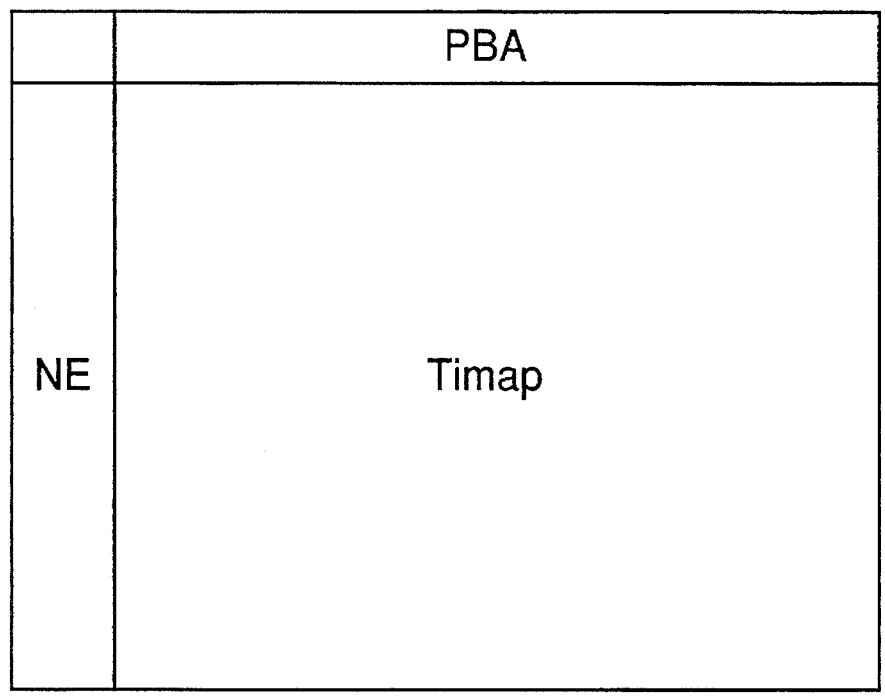
FIG. 6 shows a Ti map of a basic fuel injection amount Timap, for use when the engine is in a steady operating condition.
Figure 7:
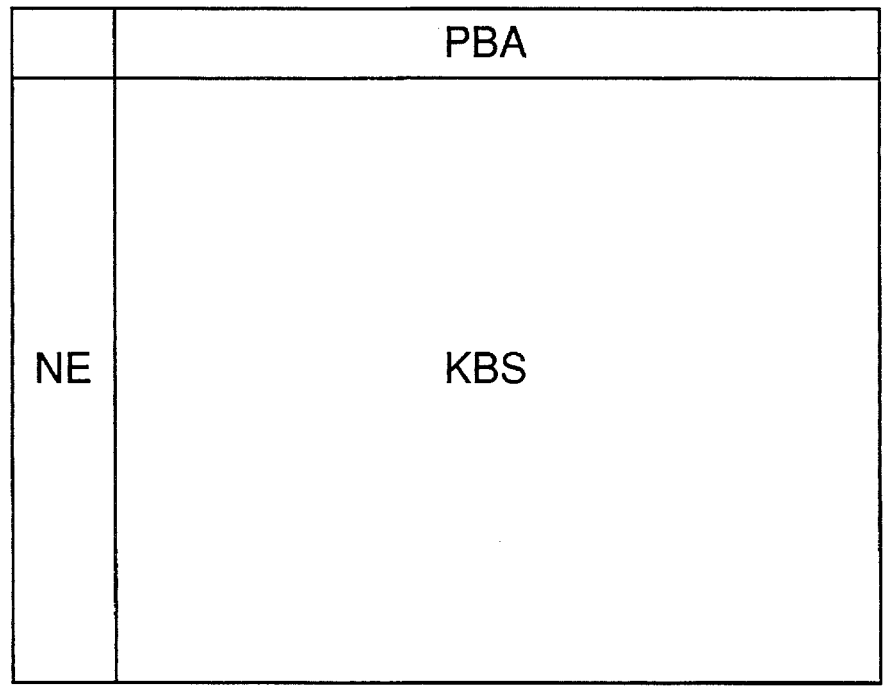
FIG. 7 shows a KCMD map of a desired correction coefficient KCMD.

On the other hand, the ROM 58 stores a Ti map shown in FIG. 6, which contains map values Timap of the basic fuel injection amount Ti which are set in advance for steady operating conditions of the engine by the speed-density method according to the engine rotational speed NE and the intake pipe absolute pressure PBA. A map value Timap of the basic fuel injection amount which has been read from the Ti map is corrected by a desired air-fuel ratio KCMD set according to the engine rotational speed NE and the intake pipe absolute pressure PBA. Therefore, the ROM 58 also stores a KCMD map shown in FIG. 7, which contains basic values KBS of the desired air-fuel ratio KCMD set in advance according to the engine rotational speed NE and the intake pipe absolute pressure PBA. The map values Timap are set by the use of the aforementioned fluid dynamics model such that they are suitable for steady operating conditions of the engine. They are set in terms of a valve opening period over which the fuel injection valve 22 is opened.

A map value Timap1 read from the Ti map under a specific steady operating condition defined by the engine rotational speed NE and the intake pipe absolute pressure PBA is expressed by the following equation (4):

$$Timap1 = TABLE(NE1, PBA1) \qquad (4)$$

By setting map values such that they satisfy the equations based on the model, the basic fuel injection amount Timap1' read from the map naturally agrees with a basic fuel injection amount Timap1' which is determined from the fluid dynamics model in a steady operating condition of the engine.

On the other hand, the basic fuel injection amount Timap1' for steady operating conditions of the engine and a basic fuel injection amount Timap2' for transient operating conditions of the engine are expressed by the following equations (5) and (6), provided that the desired air-fuel ratio KCMD is equal to a stoichiometric air-fuel ratio (14.7:1):

$$Timap1' = Gth1 \times \Delta T/14.7$$

provided:

$$Gth1 = A1 \cdot \rho \cdot \sqrt{2g \frac{P1 - P2}{\gamma}} \qquad (5)$$

$$Timap2' = Gth2 \times \Delta T/14.7 - \Delta Gb2/14.7$$

provided:

$$Gth2 = A \cdot \rho \cdot \sqrt{2g \frac{P1 - P2}{\gamma}} \qquad (6)$$

When these equations are compared with each other, the amount of air Gth1 flowing through the throttle valve in a steady operating condition of the engine is distinguished from the amount of air Gth2 flowing through the throttle valve in a transient operating condition of the engine only in the effective opening areas A1 and A. Therefore, an amount of air Gth2 flowing through the throttle valve in a transient operating condition of the engine can be expressed by the following equation (7):

$$Gth2 = (A/A1) \times Gth1 \qquad (7)$$

As is clear from the equation (7), by the use of a ratio of the effective opening area of the throttle valve in a steady operating condition of the engine to that in a transient operating condition of the engine, the amount of air Gth2 flowing through the throttle valve in a transient operating condition of the engine can be expressed based on the amount of air flowing through the throttle valve in a steady operating condition of the engine.

Figure 8:
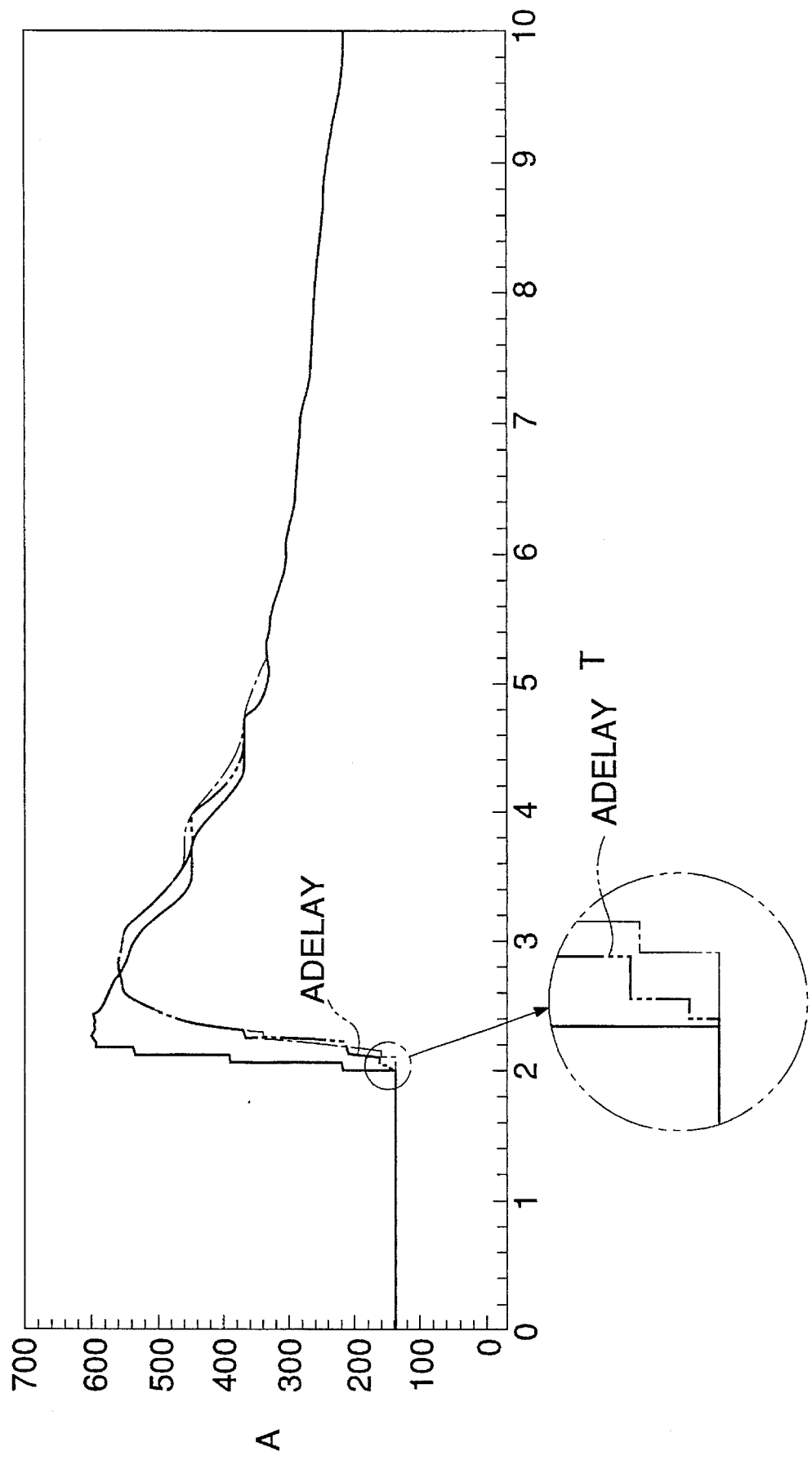
FIG. 8 is a graph showing data obtained as results of a simulation on the effective opening area of the throttle valve.

Further, assuming that the present value of the effective opening area of the throttle valve is represented by A, the effective opening area A1 of the throttle valve in a steady operating condition of the engine can be grasped as a first-order delay of the present value A of the effective opening area (FIG. 8). In other words, if the first-order delay value of the A value is represented by "ADELAY", the values A1 and ADELAY are substantially equal to each other. Therefore, "A/(first-order delay value of A)" suffices for approximating "A/A1" appearing in the equation obtained from the fluid dynamics model.

As shown in FIGS. 9A and 9B, in a transient operating condition of the engine, i.e. at the instant of opening the throttle valve in the illustrated example, the differential pressure between upstream and downstream sides of the throttle valve is large, which causes air to rush through the throttle valve and then the engine operating condition is progressively stabilized into a steady operating condition. When the engine is in such a transient operating condition, the amount of air Gth flowing through the throttle valve can be expressed as a ratio of A/ADELAY, whereas when the engine is in the steady operating condition, the value of A/ADELAY becomes equal to 1, as shown in FIG. 9B. This ratio (A/ADELAY) will be referred to hereinafter as "RATIO-A".

Figure 10A:
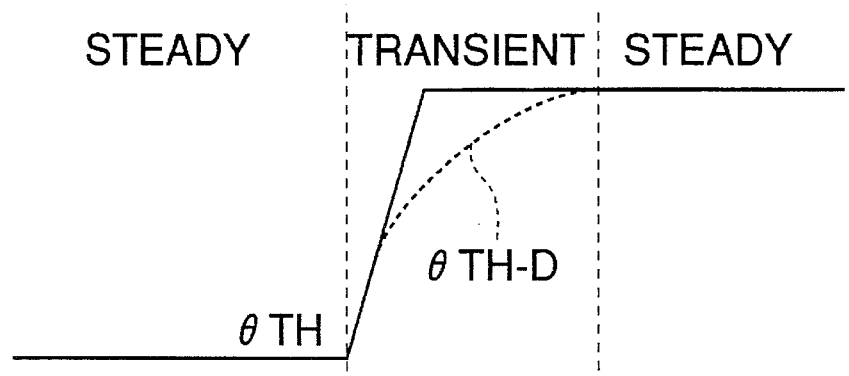
FIG. 10A shows, by way of example, changes in the throttle valve opening θTH exhibited when the engine is in a transient operating condition and steady operating conditions.
Figure 10B:
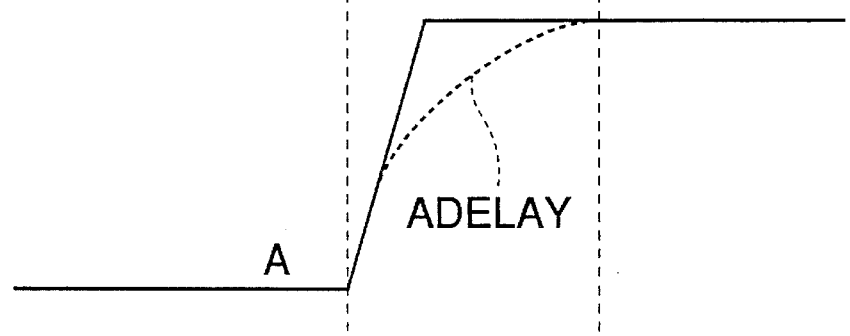
FIG. 10B shows, by way of example, changes in the effective opening area A of the throttle valve exhibited when the engine is in a transient operating condition and steady operating conditions.

The effective opening area of the throttle valve is largely dependent on the throttle valve opening θTH, i.e. changes in a fashion substantially following up a change in the throttle valve opening (FIGS. 10A and 10B). Therefore, here the first-order delay of the effective opening area is considered as equivalent to the first-order delay of the throttle valve opening. Further, to eliminate a delay or time lag before the amount of air ΔGb charged in the chamber reflects on the intake air amount Gc, the first-order delay of the ΔGb value is also taken into account.

Thus, the amount of air Gb charged in the chamber is calculated from the amount of air Gth flowing through the throttle valve. Then, the amount of air Gc introduced into the cylinder can be determined based on the amount of air Gth flowing through the throttle valve by the use of the equation (3). This simplifies the construction of the intake air amount-estimating apparatus and reduces amounts of calculations. More specifically, the intake air amount Gc per unit time period ΔT can be expressed by the following equation (8). Equations (9) and (10) can be expressed by the use of a transfer function as the following equation (11):

$$Gc(k) = Gth(k) - Gb(k-1) \qquad (8)$$

$$Gc(k) = \alpha \times Gth(k) + \beta \times Gb(k-1) \qquad (9)$$

$$Gb(k) = (1-\alpha) \times Gth(k) + (1-\beta) \times Gb(k-1) \qquad (10)$$

$$Gy(z) = \{\alpha \times z - (\alpha-\beta)\}/\{z-(1-\beta)\} \times Gth(z) \qquad (11)$$

As is clear from the equation (11), the intake air amount Gc can be determined from the first-order delay value of the amount of air Gth flowing through the throttle valve.

Figure 11:
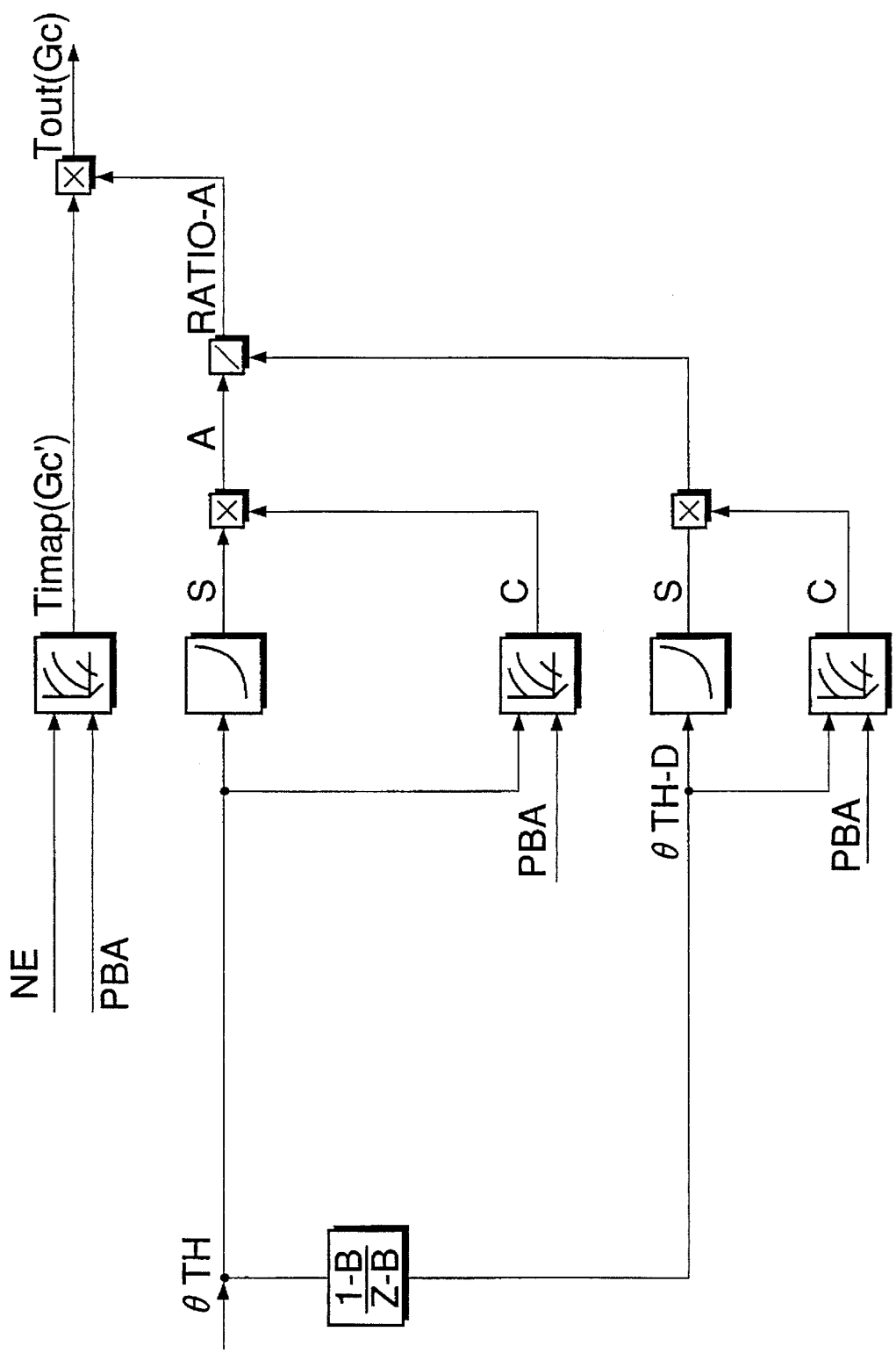
FIG. 11 is a block diagram which is useful in explaining functions of the intake air amount-estimating apparatus and a manner of calculating a fuel injection amount (intake air amount)

FIG. 11 shows blocks of functions of the intake air amount-estimating apparatus for carrying out the arithmetic operations described above. The intake air amount Gc can be treated in the same manner as the fuel injection amount. Accordingly, the intake air amount is designated or treated hereinafter as the fuel injection amount for convenience's sake in figures illustrating blocks of functions of the apparatus of the present embodiment, hereinafter referred to. Further, "(1−B)/(z−B)" appearing in the figures is a transfer function of a discrete system representing a first-order delay.

Accordingly, assuming that the basic fuel injection amount determined by retrieving the Ti map under a specific steady operating condition of the engine (i.e. determined by the engine rotational speed NE and the intake pipe absolute pressure PBA) is represented by Timap, the fuel injection amount Tout to be actually injected is determined by the following equation (12):

$$Tout = Timap \times RATIO\text{-}A \quad (12)$$

Figure 12:
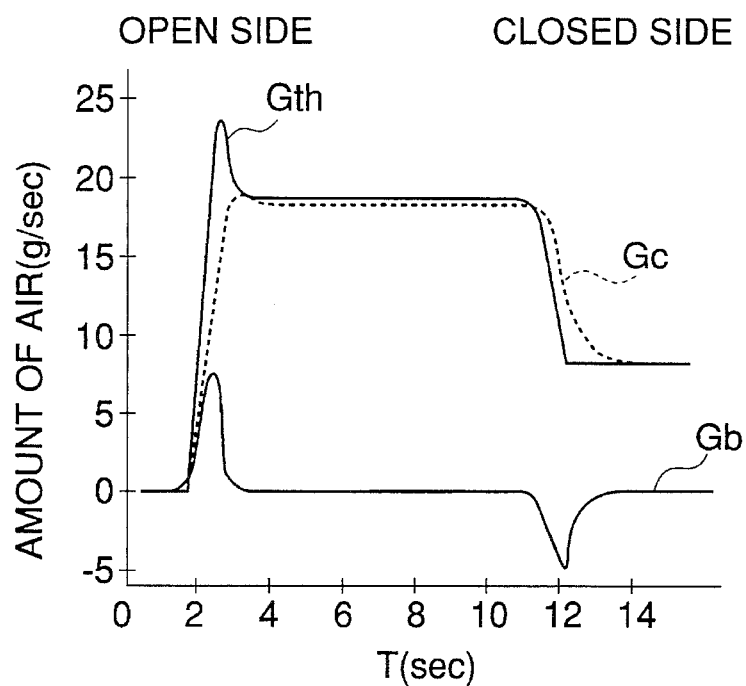
FIG. 12 is a graph showing a behavior of intake air detected as the amount of air flowing through the throttle valve, the amount of intake air drawn into a cylinder, and the amount of air charged in a chamber of an intake pipe, exhibited when the engine is accelerating and decelerating.
Figure 13A:
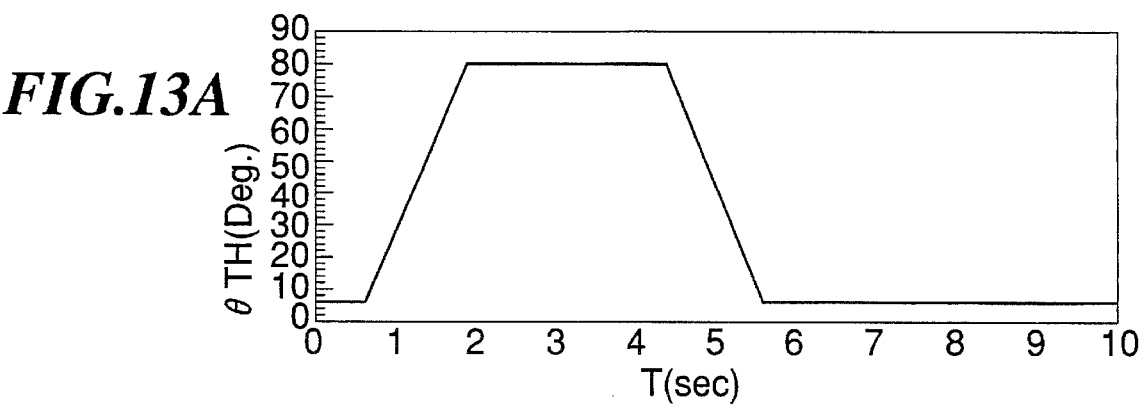
FIGS. 13A and 13B show a timing chart which is useful in explaining different behaviors of pressure within the chamber between when the throttle valve is being opened and when the same is being closed.
Figure 13B:
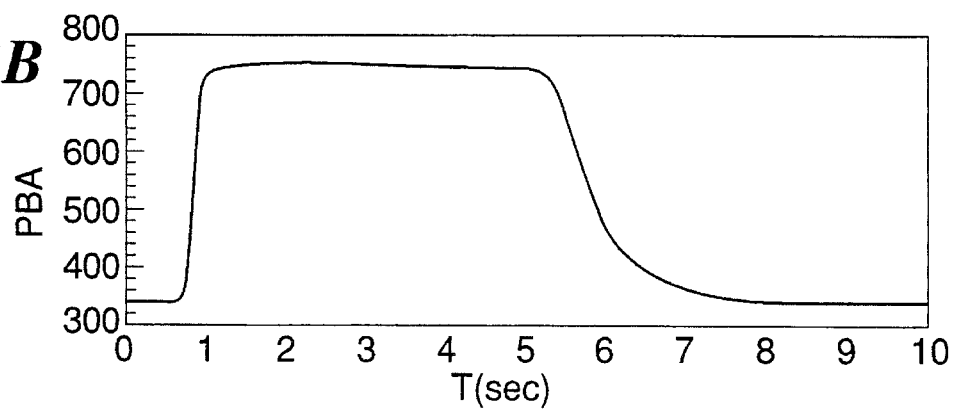

A simulation of the behavior of the intake air proved that the amount of intake air behaves differently between when the amount of air Gb charged in the chamber increases and when the same decreases. The behavior of the intake air is shown in FIG. 12. The figure was prepared by paying attention to the movement of the throttle valve, which is a major factor for a change in the amount of air Gb charged in the chamber, and shows the resulting behaviors of the intake air amount (the amount of air flowing through the throttle valve, the amount of air drawn into the cylinder, the amount of air charged in the chamber) exhibited when the throttle valve is displaced toward an open position and when the same is displaced toward a closed position. Further, FIG. 13B shows a change in the pressure within the chamber occurring as the throttle valve opens and closes, as shown in 13A. As shown in the figures, the pressure within the chamber also behaves differently between when the throttle valve is displaced toward an open position and when the same is displaced toward a closed position. Presumably, the fact that the intake air is a compressible fluid is a cause of such different behaviors of the intake air between when the throttle valve is displaced toward an open position and when the same is displaced toward a closed position.

Therefore, in the intake air amount-estimating apparatus according to the present embodiment, a first-order delay correction coefficient B for calculating a first-order delay value θTH-D of the throttle valve opening θTH is calculated in manners selected depending on whether the amount of air Gb charged in the chamber increases or decreases.

Figure 14:
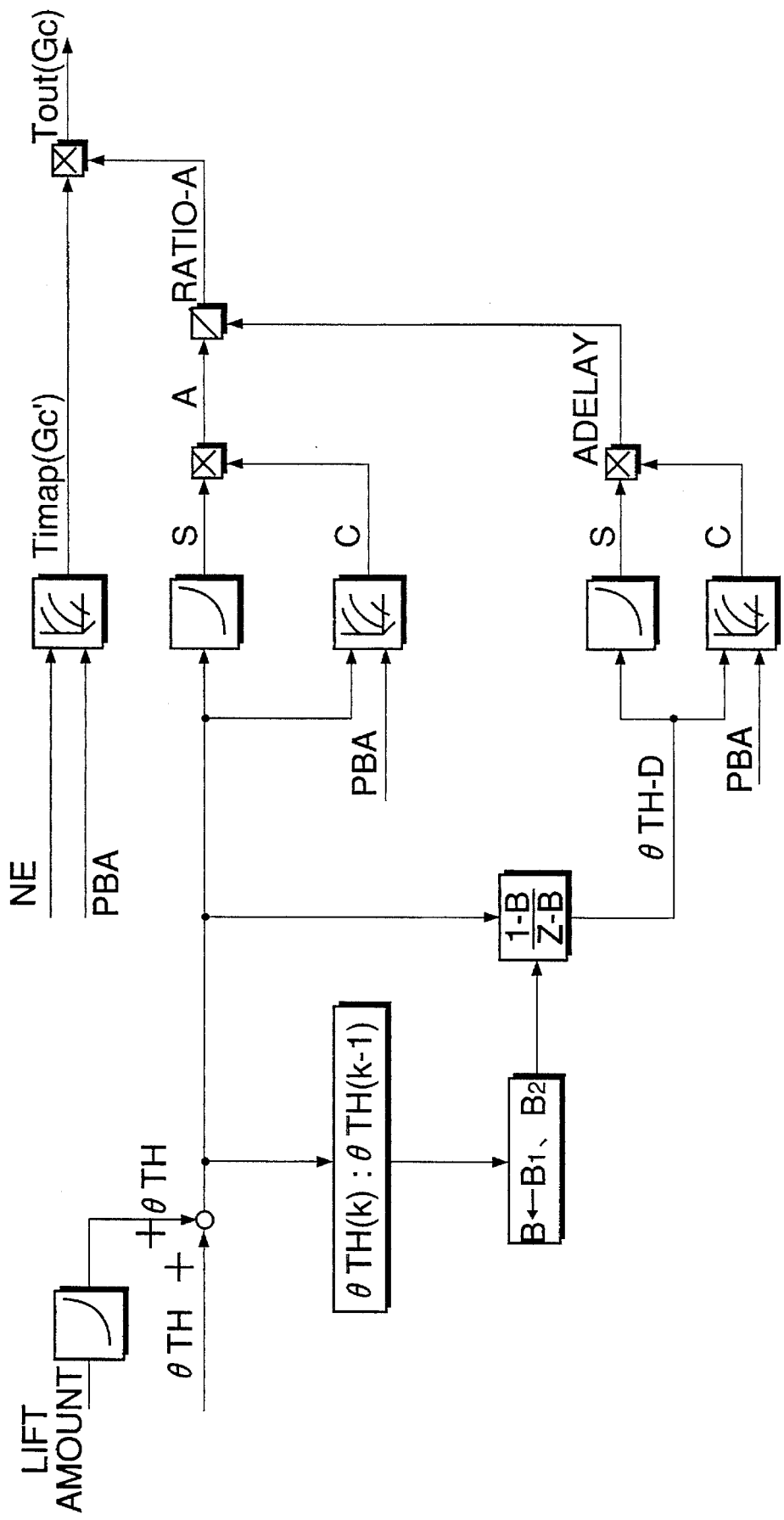
FIG. 14 is a block diagram which is useful in explaining functions of the intake air amount-estimating apparatus, and a manner of calculating a fuel injection amount (intake air amount) when a first-order delay correction coefficient applied in calculating a first-order delay value θTH-D of the throttle valve opening θTH is set to different values depending on operating conditions of the engine.
Figure 15:
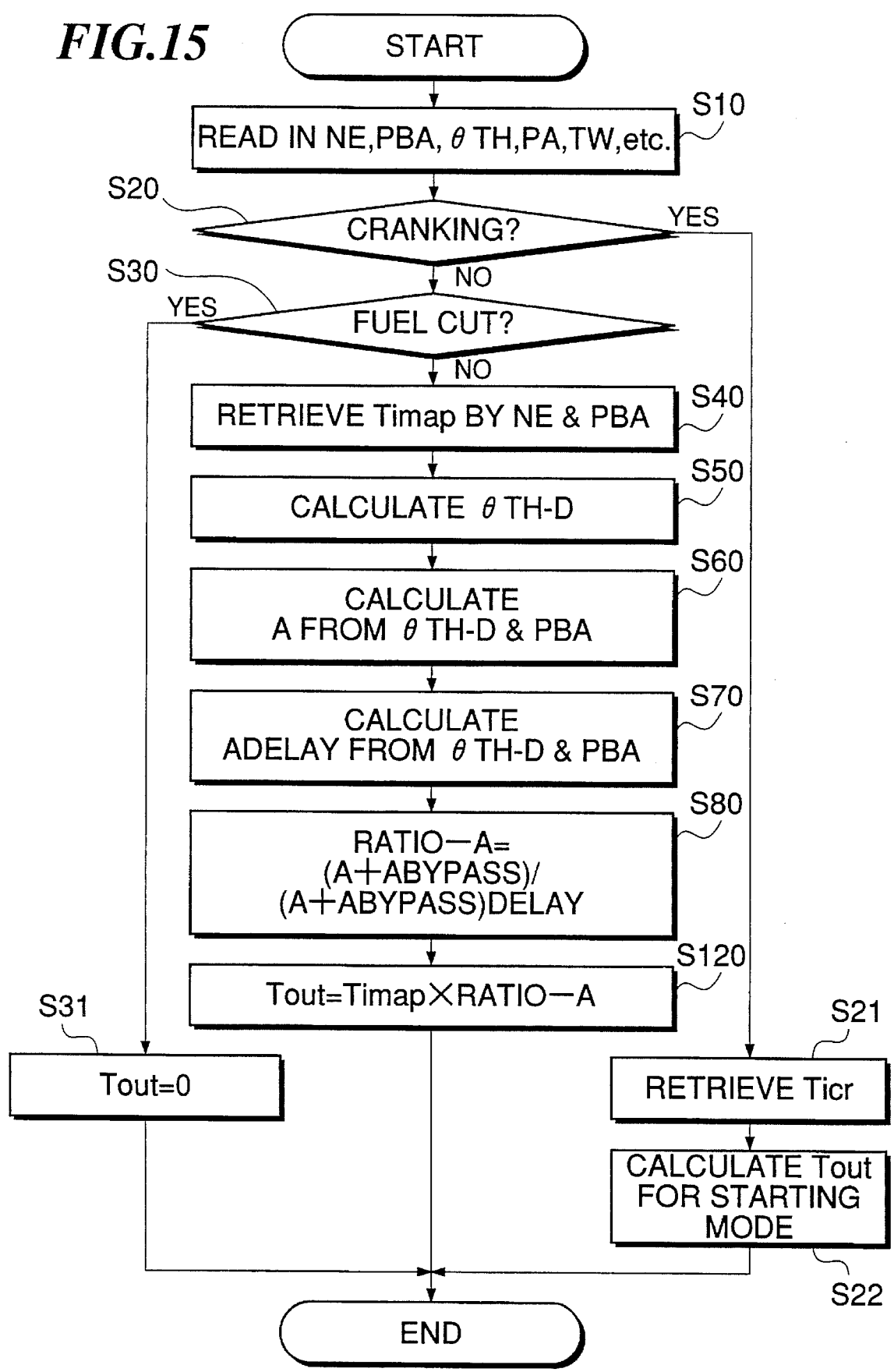
FIG. 15 is a flowchart showing a main routine for calculating the fuel injection amount (intake air amount)

Next, the operation of the intake air amount-estimating apparatus according to the first embodiment will be described with reference to FIG. 14 illustrating the blocks of functions thereof and FIG. 15 showing a main routine executed thereby. This routine is executed in synchronism with generation of each TDC signal pulse.

Referring to FIG. 15, first, values of operating parameters, such as the engine rotational speed NE, the intake pipe absolute pressure PBA, the throttle valve opening θTH, the atmospheric pressure PA, and the engine coolant temperature TW, which are detected by respective sensors, are read in at a step S10. Further, as to the throttle valve opening θTH, a value thereof assumed during idling of the engine, i.e. when the throttle valve is in a fully-closed state thereof is learned and used for predetermined control operations.

Then, it is determined at a step S20 whether or not the engine is in a starting mode, i.e. being cranked. If the engine is not in the starting mode, it is determined at a step S30 whether or not fuel cut is being carried out. If fuel cut is not being carried out, the Ti map stored in the ROM 58 is retrieved according to the engine rotational speed NE and the intake pipe absolute pressure PBA to determine a map value Timap of the basic fuel injection amount Ti for steady operating conditions (equivalent to the intake air amount Gc' for steady operating conditions, in the present embodiment) at a step S40. The map value Timap read from the Ti map of the fuel injection amount Ti is corrected according to the atmospheric pressure PA, etc., as required, at steps, not shown.

Figure 16:
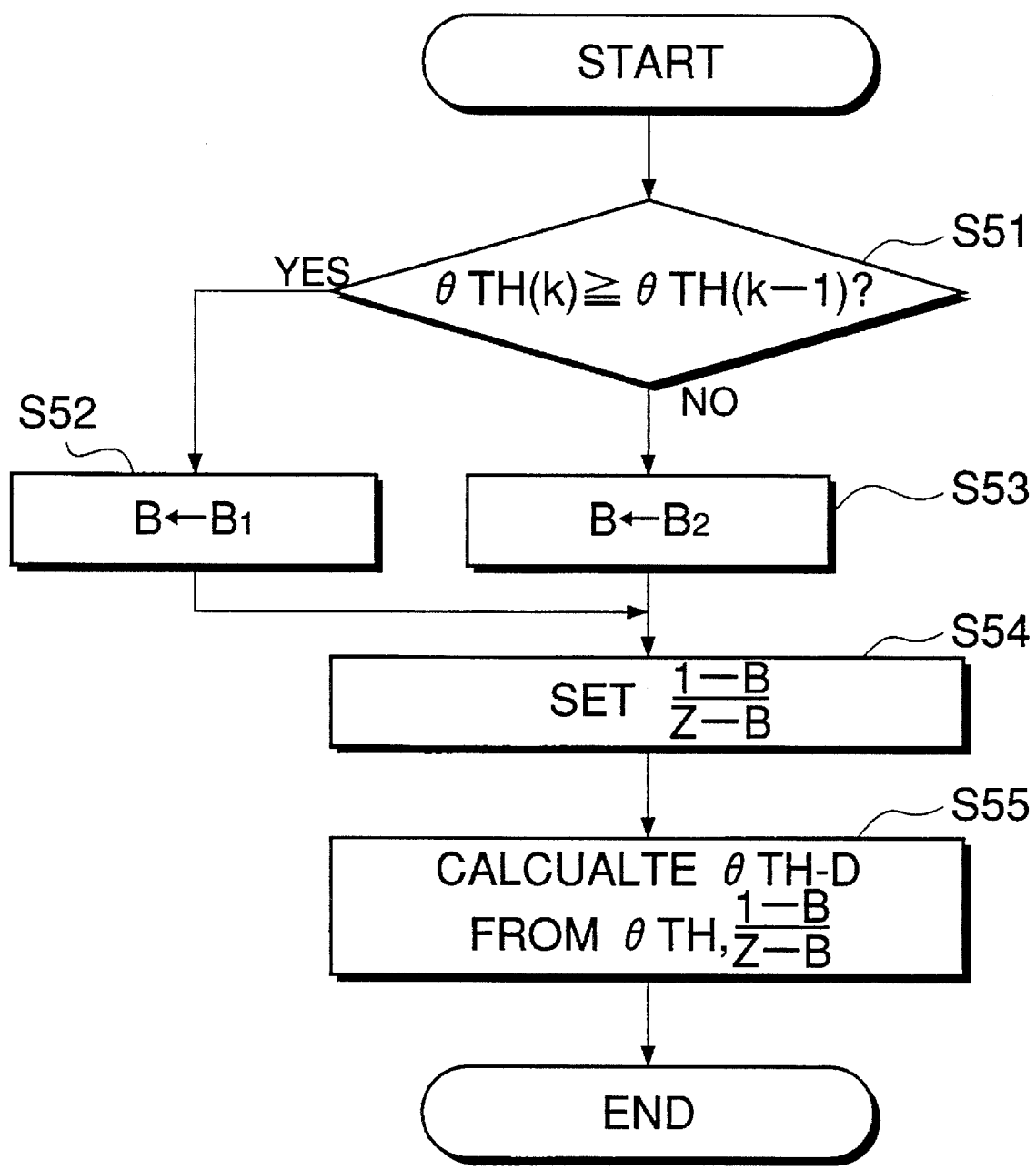
FIG. 16 is a flowchart showing a subroutine for calculating the first-order delay value θTH-D of the throttle valve opening θTH, which is executed at a step S50 in FIG. 15.

Then, the first-order delay θTH-D of the value of the throttle valve opening θTH read in at the step S10 is calculated at a step S50. FIG. 16 shows a subroutine executed at the step S50. This subroutine is also executed in synchronism with generation of each TDC signal pulse.

First, it is determined at a step S51 based on the throttle valve opening θTH value obtained from the throttle valve sensor 36 whether or not the engine is accelerating or decelerating. This determination is carried out through comparison of a throttle valve opening value θTH(k) detected in the present loop and a throttle valve opening value θTH(k−1) detected in the immediately preceding loop. That is, if θTH(k)≧θTH(k−1) holds, it is determined that the engine is accelerating, whereas if θTH(k)<θTH(k−1) holds, it is determined that the engine is decelerating.

If the engine is determined to be accelerating, the first-order delay correction coefficient B is set to a value B1 for accelerating condition (e.g. B1=0.4) at a step S52. On the other hand, if the engine is determined to be decelerating, the same is set to a value B2 for decelerating condition (e.g. B2=0.8) at a step S53.

Then, by the use of the first-order delay correction coefficient B obtained in the manner describe above, the first-order delay transfer function "(1−B)/(z−B)" of the throttle valve opening θTH is set at a step S54. Then, the first-order delay value θTH-D is calculated by the use of the first-order delay transfer function "(1−B)/(z−B)" of the throttle valve opening θTH and the throttle valve opening θTH at a step S55.

Referring again to the main routine of FIG. 15, the present value of the effective opening area A of the throttle valve is calculated in the manner described above at a step S60. Then, the first-order delay value ADELAY of the effective opening area A of the throttle valve is calculated from the first-order delay value θTH-D of the throttle valve opening θTH and the intake pipe absolute pressure PBA at a step S70.

At a step S80, the aforementioned ratio RATIO-A is calculated by the use of the following equation (13):

$$RATIO\text{-}A = (A + ABYPASS)/(A + ABYPASS)\ DELAY \quad (13)$$

where ABYPASS represents a value of the throttle valve opening corresponding to an amount of air drawn into the cylinder through the auxiliary air passage 32 without passing through the throttle valve (indicated 20 by "LIFT AMOUNT" in FIG. 14). For accurate determination of the amount of intake air, it is necessary to take this amount of air into account. As shown in the equation, this amount of air, i.e. the amount of auxiliary air, is converted to the value ABYPASS of the throttle valve opening, and then the value ABYPASS is added to the effective opening area A. Then, the ratio of the resulting sum (A+ABYPASS) to an approximate value "(A+ABYPASS)DELAY" of the first-order delay of the sum is set to RATIO-A.

As described above, the value ABYPASS is added to both the numerator and the denominator of the fraction representative of the ratio. As a result, even if there is an error in the estimated amount of air drawing into the cylinder without passing through the throttle valve, the resulting undesired influence on the calculated fuel injection amount can be minimized. Then, the value Timap (Gc') read from the Ti map at the step S40 is multiplied by the ratio RATIO-A to calculate the fuel injection amount Tout (Gc) corresponding to the amount of air flowing through the throttle valve at a step S120.

If the engine is determined to be in the starting mode at the step S20, a predetermined table, not shown, is retrieved to determine a basic fuel injection amount Ticr for the starting mode at a step S21, and then the fuel injection amount Tout is determined based on the basic fuel injection amount Ticr by the use of an equation for the starting mode, not shown, at a step S22.

On the other hand, if it is determined that fuel cut is being carried out, the fuel injection amount Tout is set to zero at a step S31.

Then, an evaluation was made as to whether the intake air amount can be estimated more accurately when the first-order delay correction coefficient B for setting the first-order delay value of the throttle valve opening θTH is set in manners different between when the engine is accelerating and when the engine is decelerating, compared with when the first-order delay correction coefficient B is set to a fixed value. This evaluation was made with the engine rotational speed NE and the intake pipe absolute pressure PBA held at respective fixed values.

Figure 17A:
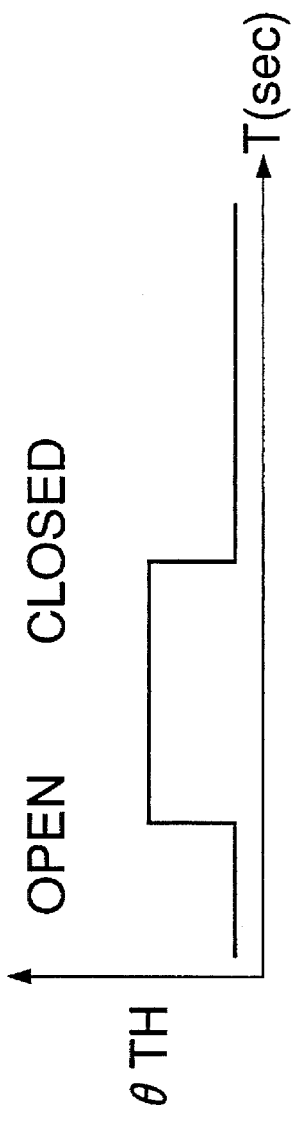
FIG. 17A is a graph showing, by way of example, changes in the throttle valve opening θTH.
Figure 17B:
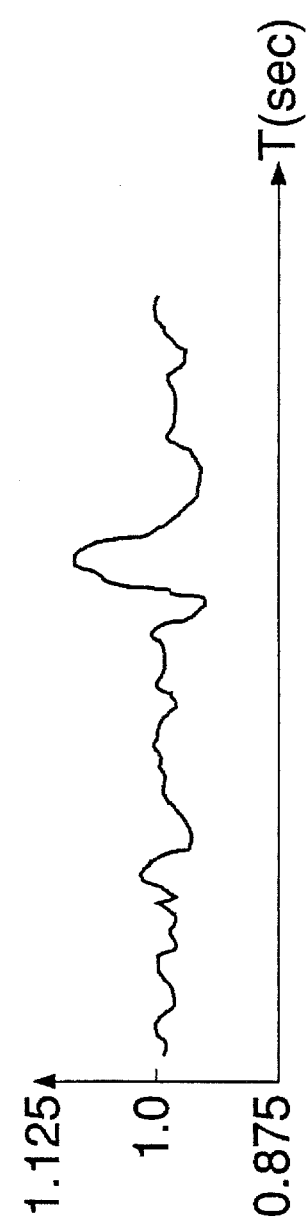
FIG. 17B is a graph showing, by way of example, changes in the air-fuel ratio of a mixture supplied to the engine detected as the throttle valve opening θTH changes as shown in FIG. 17A, when the first-order delay correction coefficient for calculating the first-order delay value θTH-D is set to a fixed value.
Figure 17C:
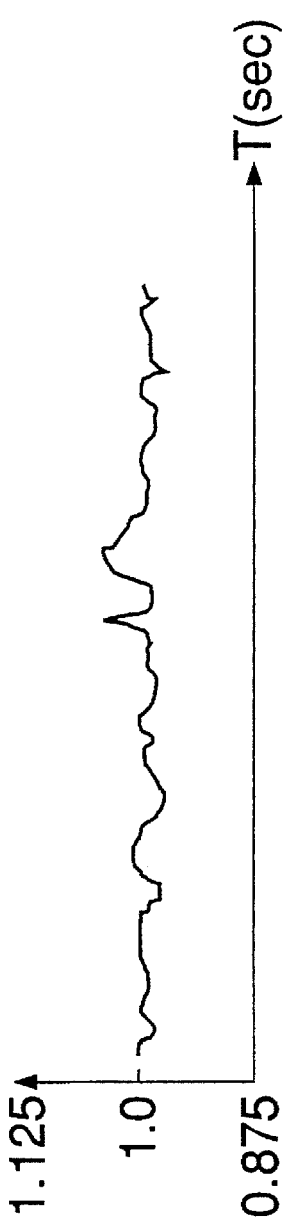
FIG. 17C is a graph showing, by way of example, changes in the air-fuel ratio of the mixture supplied to the engine detected as the throttle valve opening changes as shown in FIG. 17A, when the first-order delay correction coefficient is set to different values between when the throttle valve is being opened and when the same is being closed.

FIGS. 17A to 17C show results of the evaluation. FIG. 17A shows a change in the throttle valve opening θTH caused by suddenly opening (accelerating condition) and subsequently closing the same to a predetermined opening degree (decelerating condition). When the throttle valve opening θTH was changed in this manner, it was recognized in the case where the first-order delay correction coefficient B was held at the fixed value (FIG. 17B) that there is a large fluctuation in the air-fuel ratio when the throttle valve is closed. In contrast, in the case where the correction coefficient B was set to different values respectively suitable for opening and closing operations of the throttle valve (FIG. 17C), it was recognized the fluctuation in the air-fuel ratio is reduced, compared with the FIG. 17B case, such that the air-fuel ratio curve remains almost flat. This tells that the setting of the correction coefficient B to respective different values for opening and closing operations of the throttle valve makes it possible to more accurately estimate the intake air amount Gc (fuel injection amount Tout). The ordinates in FIGS. 17B and 17C represent the equivalent ratio, i.e. Mst/M (Mst: stoichiometric air-fuel ratio; M: air consumption amount/fuel consumption amount).

Next, a variation of the present embodiment will be described with reference to FIG. 18. In the above described embodiment, an increase and a decrease in the amount of air charged in the chamber Gb are detected only based on the throttle valve opening. However, an increase and a decrease in the amount of air charged in the chamber are also caused by factors mentioned below, and therefore, according to the variation, these factors are totally taken into account to detect a change in the amount of air charged in the chamber. More specifically, the amount of air charged in the chamber substantially changes when the engine rotational speed NE changes, when the shape of the intake manifold is mechanically changed to increase or decrease the volume thereof, when the atmospheric pressure changes, when the valve timing of opening and closing intake and exhaust valves is changed, when the desired air-fuel ratio is changed, for example.

In the present variation, these factors are totally taken into account to detect whether the amount of air Gb charged in the chamber increases or decreases, and based on results of the detection the first-order delay value θTH-D of the throttle valve opening θTH is calculated.

Figure 18:
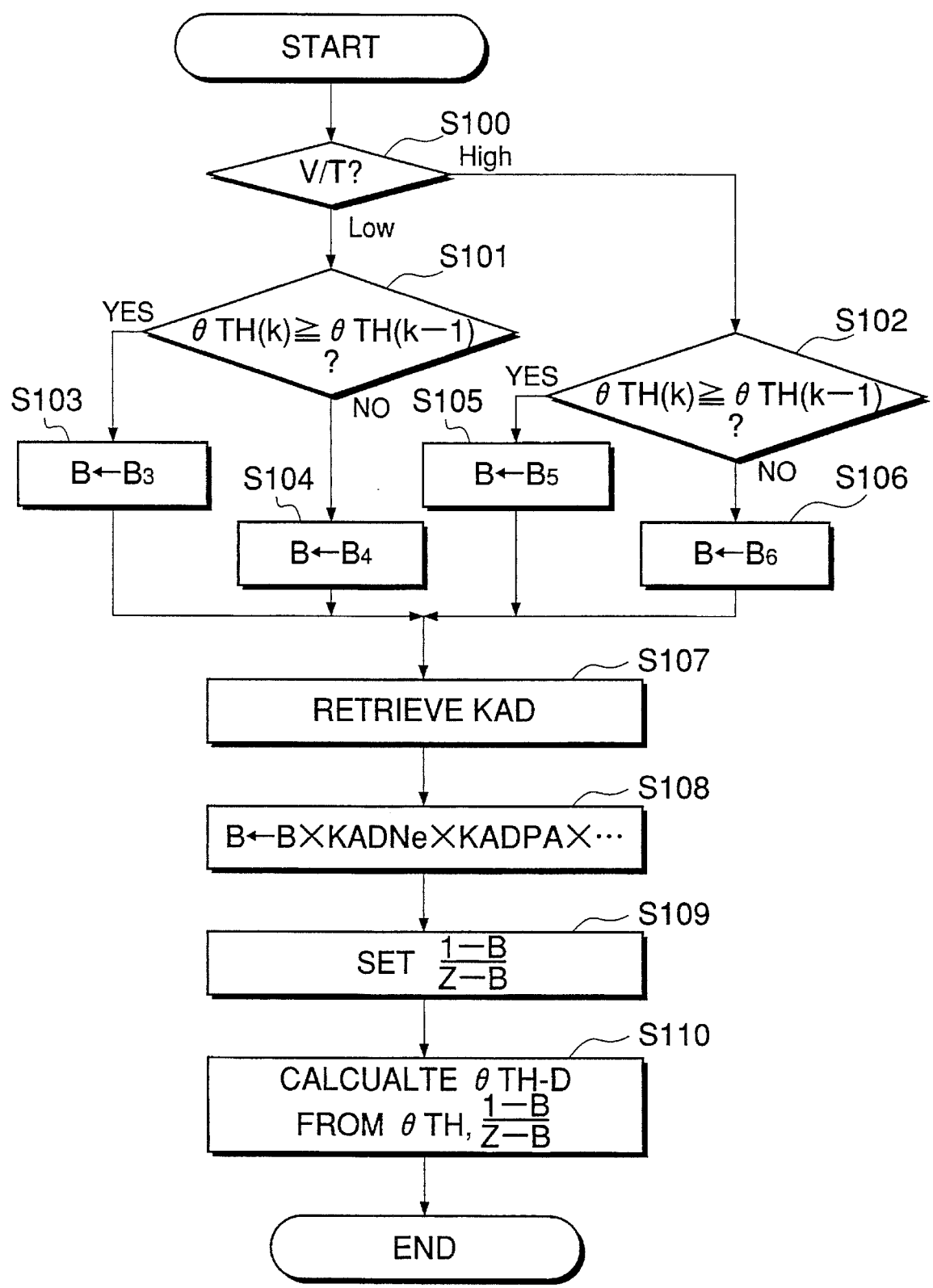
FIG. 18 is a flowchart showing a subroutine for calculating the first-order delay value θTH-D of the throttle valve opening θTH, which is executed by a variation of the embodiment.
Figure 19A:
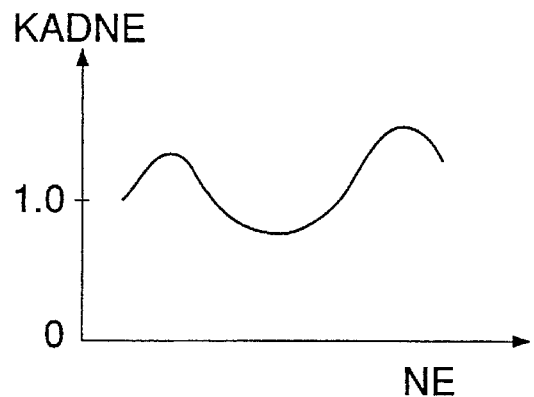
FIG. 19A is a graph showing the relationship between the engine rotational speed NE and a NE-dependent corrections coefficient KADNE.
Figure 19B:
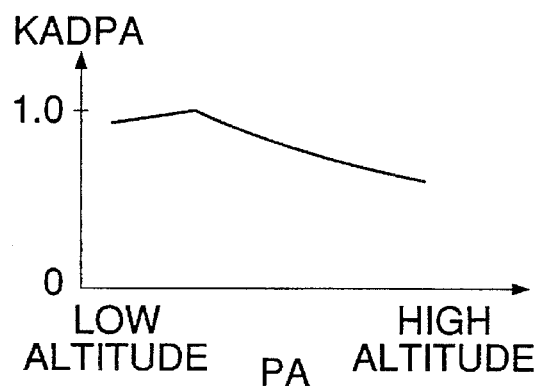
FIG. 19B is a graph showing the relationship between atmospheric pressure PA and a PA-dependent correction coefficient KADNE.
Figure 19C:
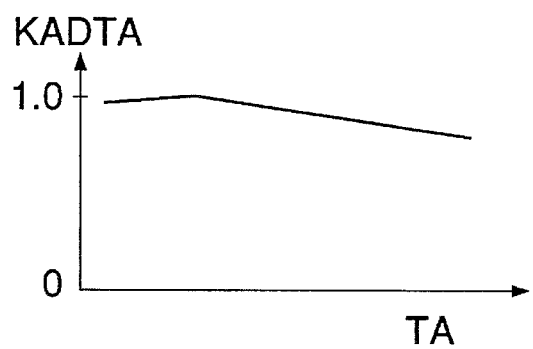
FIG. 19C is a graph showing the relationship between intake air temperature TA and a TA-dependent correction coefficient KADTA.
Figure 19D:
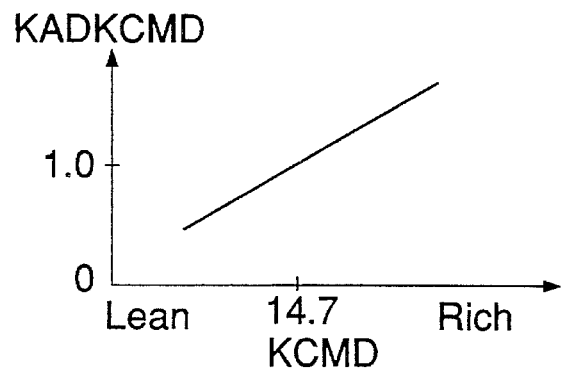
FIG. 19D is a graph showing the relationship between the desired air-fuel ratio KCMD and a KCMD-dependent correction coefficient KCMD.

FIG. 18 shows a routine for calculating the first-order delay θTH-D of the throttle valve opening θTH, according to the present variation. This routine is executed at the step S50 of the FIG. 15 main routine, in synchronism with generation of each TDC signal pulse.

First, it is determined at a step S100 whether or not the valve timing is set to the high-speed valve timing or to the low-speed valve timing. Then, irrespective of the answer to this question, it is determined at a step S101 or S102 whether or not the engine is accelerating or decelerating, in the same manner as described with reference to FIG. 16.

If it is determined at the step S101 that the engine is accelerating, the first-order delay correction coefficient B is set to a correction coefficient B3 for accelerating condition (e.g. B3=0.4) at a step S103, whereas if it is determined at the step S101 that the engine is decelerating, the first-order delay correction coefficient B is set to a correction coefficient B4 for decelerating condition (e.g. B4=0.8) at a step S104.

Similarly, if it is determined at the step S102 that the engine is accelerating, the first-order delay correction coefficient B is set to a correction coefficient B5 for accelerating condition (e.g. B5=0.3) at a step S105, whereas if it is determined at the step S102 that the engine is decelerating, the first-order delay correction coefficient B is set to a correction coefficient B6 for decelerating condition (e.g. B6=0.6) at a step S106. Thus, when the high-speed valve timing is selected, the first-order delay coefficient B is set to a smaller value than when the low-speed valve timing is selected. Further, in both the cases where the high-speed valve timing is selected and the low-speed valve timing is selected, the first-order delay correction coefficient B for accelerating condition is set to a smaller value than that for decelerating condition.

Further, the first-order delay correction coefficient B is corrected according to the above-mentioned factors causing a change in the amount of air charged in the chamber, i.e. the engine rotational speed NE, the atmospheric pressure PA, etc. To make the corrections, as shown in FIG. 19, maps of an NE (engine rotational speed)-dependent correction coefficient KADNE, a PA (atmospheric pressure)-dependent correction coefficient KADPA, a TA (intake air temperature)-dependent correction coefficient KADTA, and a KCMD (desired air-fuel ratio)-dependent correction coefficient KADKCMD are provided, whose map values are set according to the respective parameters, i.e. the engine rotational speed NE, the atmospheric pressure PA, and so on, and these maps are retrieved to read the respective correction coefficients therefrom at a step S107. Then, the first-order delay correction coefficient B set at any of the steps S103 to S106 is multiplied by the correction coefficients KADNE, KADPA, KADTA and KADKCMD, and the resulting value is set to the final value of the first-order delay correction coefficient B at a step S108.

Then, by the use of the first-order delay correction coefficient B of the throttle valve opening set in the manner describe above, the first-order delay transfer function "(1−B)/(z−B)" of the throttle valve opening θTH is set at a step S109. Then, the first-order delay value θTH-D is calculated by the use of the first-order delay transfer function "(1−B)/(z−B)" of the throttle valve opening θTH and the throttle valve opening θTH at a step S110.

By the use of the first-order delay θTH-D of the throttle valve opening thus determined, the fuel injection amount Tout is calculated by the FIG. 15 main routine.

Although in the FIG. 18 variation of the present embodiment, it is determined at the step S100 whether the valve timing is set to the high-speed valve timing or to the low-speed valve timing, this is not limitative, but a change in the volume of the intake manifold may be detected at this step. To this end, it is only required to detect issue of a control signal instructing mechanically changing the shape of the intake manifold. If the result of the detection indicates an increase in the volume of the intake manifold, which means that the response delay to a change in the intake air amount increases, the program proceeds to the step S101 in the FIG. 18 routine, where the first-order delay coefficient is set to a relatively larger value, whereas if the result of the determination at the step S100 indicates a decrease in the volume of the same, which means that the response delay decreases, the program proceeds to the step S102, where the first-order delay coefficient is set to a relatively smaller value.

According to the manners of calculation of the fuel injection amount described above, operating conditions of the engine, i.e. steady condition and transient condition of the engine, can be represented by a simple algorithm, to ensure a certain level of accuracy of the required fuel injection amount for steady operating condition by map retrieval of the fuel injection amount (intake air amount), and thereby enable determination of the optimum fuel injection amount without requiring complicated arithmetic operations. Moreover, by setting the first-order delay correction coefficient of the throttle valve according to the behavior of the intake air which differs between when the intake air amount increases and when the same decreases, it is possible to estimate the amount of intake air more accurately, which makes it possible to further improve the controllability of the engine operation and the control accuracy.

Figure 20:
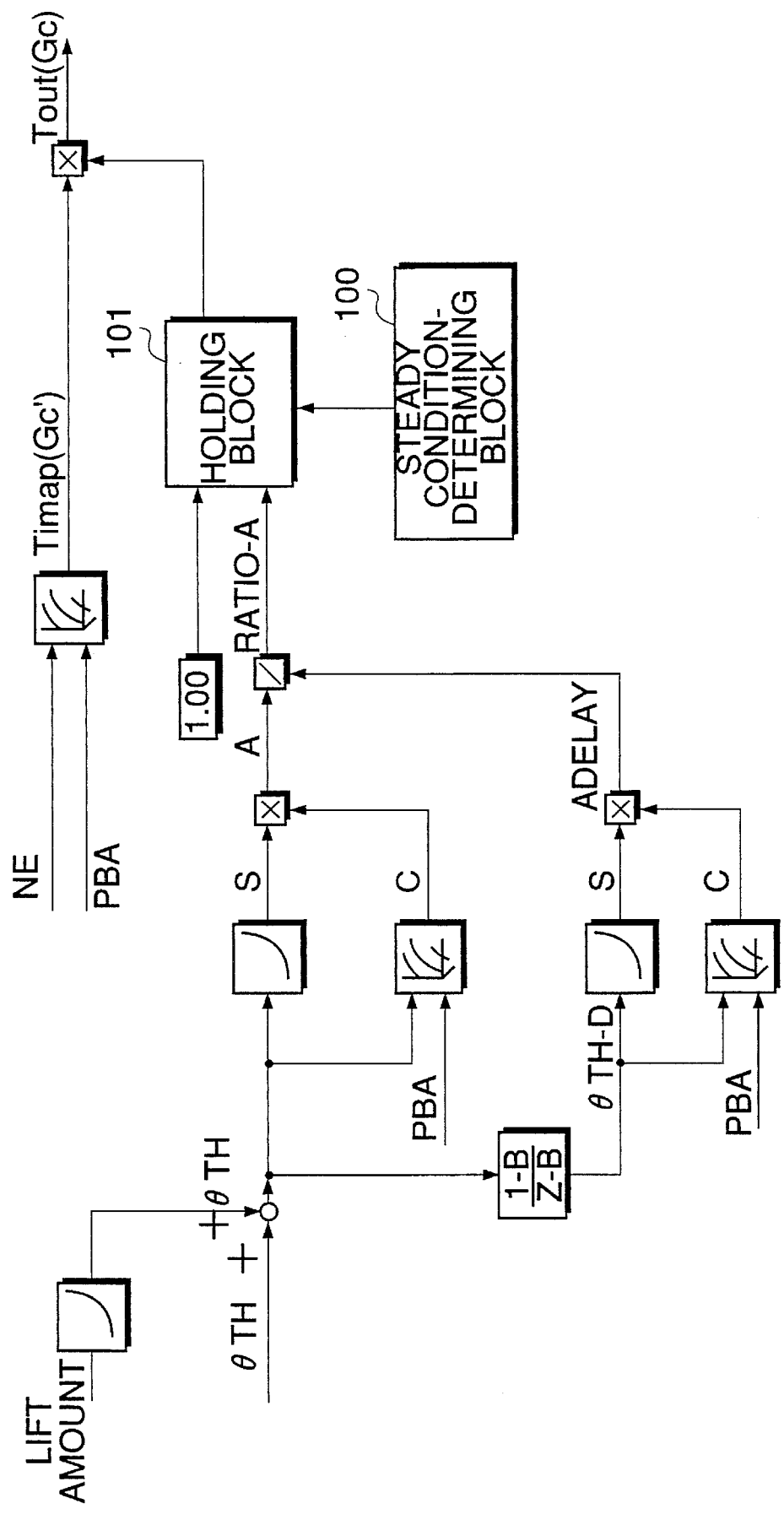
FIG. 20 is a block diagram which is useful in explaining functions of an intake air amount-estimating apparatus according to a second embodiment of the invention and a manner of calculating the fuel injection amount (intake air amount) thereby.

Next, a second embodiment of the invention will be described. The arrangement of an intake air amount-estimating apparatus according to the second embodiment is basically identical with that of the first embodiment. However, the estimation of the intake air amount is carried out by the arrangement of function blocks shown in FIG. 20.

When the engine is in a steady operating condition, it is important to eliminate undesired influence of noise contained in the detected value of the throttle valve opening, etc. to thereby achieve stable estimation of the intake air amount. To this end, according to the present embodiment, the intake air amount-estimating apparatus is provided with a steady condition-determining block 100 for determining whether the engine is in a steady operating condition, and a holding block 101 for setting and holding the value of the ratio RATIO-A of the effective opening area of the throttle valve to and at a predetermined value when the steady condition-determining block 100 determines that the engine is in a steady operating condition.

Figure 21:
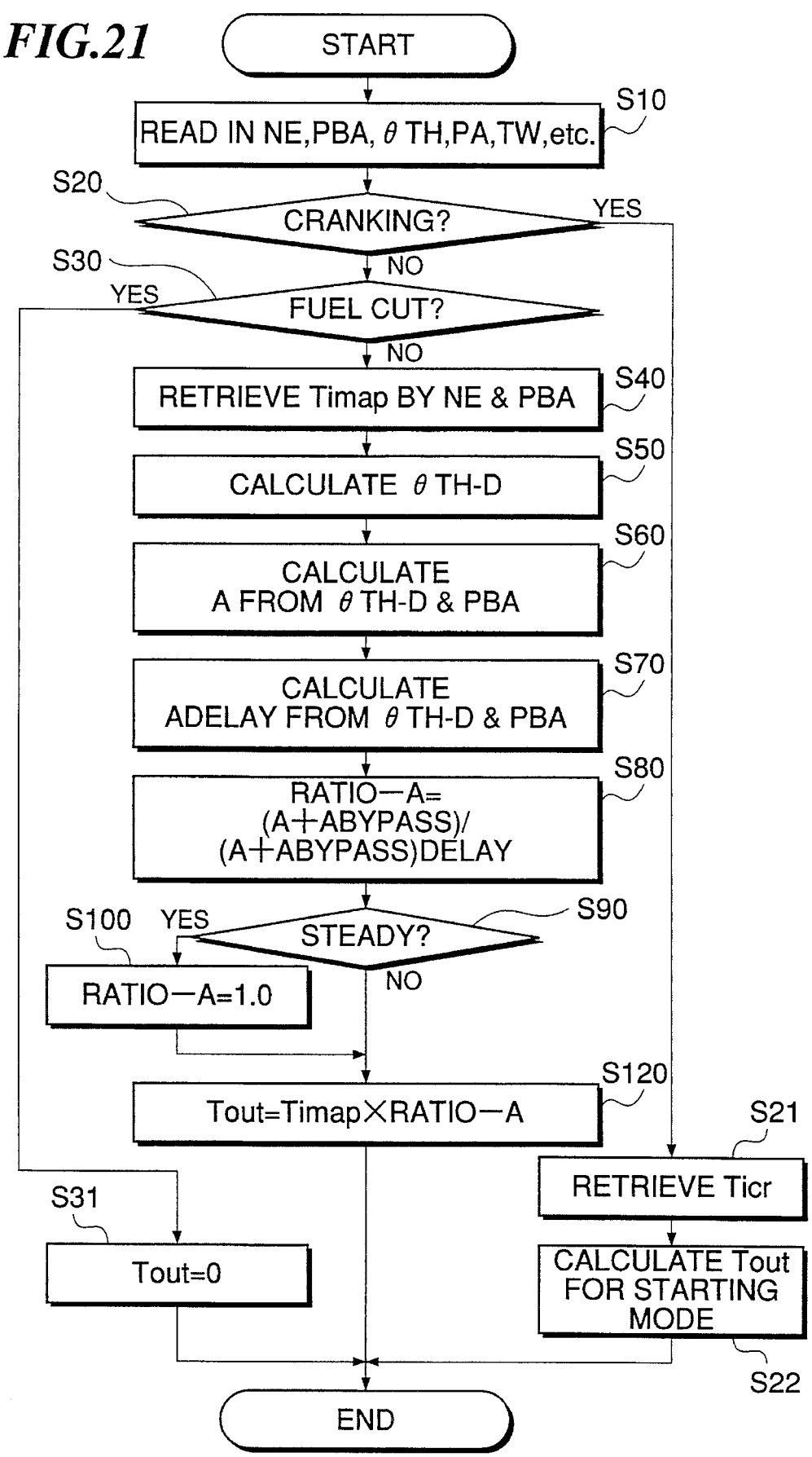
FIG. 21 is a flowchart showing a main routine for calculating the fuel injection amount (intake air amount) according to the second embodiment.

Next, a main routine for estimating the intake air amount according to the present embodiment will be described with reference to FIG. 21. This routine is executed in synchronism with generation of each TDC signal pulse.

This routine is distinguished from the FIG. 15 routine of the first embodiment only in that additional steps S90 and S100 are inserted between the steps S80 and S120, and hence corresponding steps are designated by identical steps numbers with description thereof being omitted.

Figure 22:
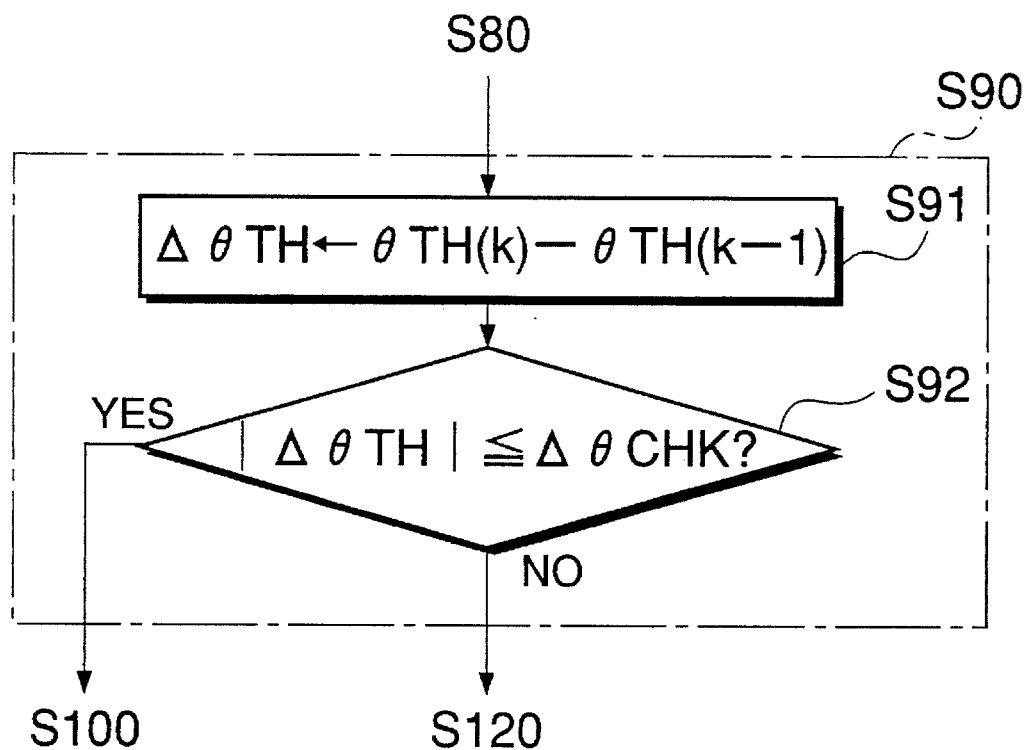
FIG. 22 is a flowchart showing a subroutine for carrying out a determination executed at a step S90 in FIG. 21.
Figure 23:
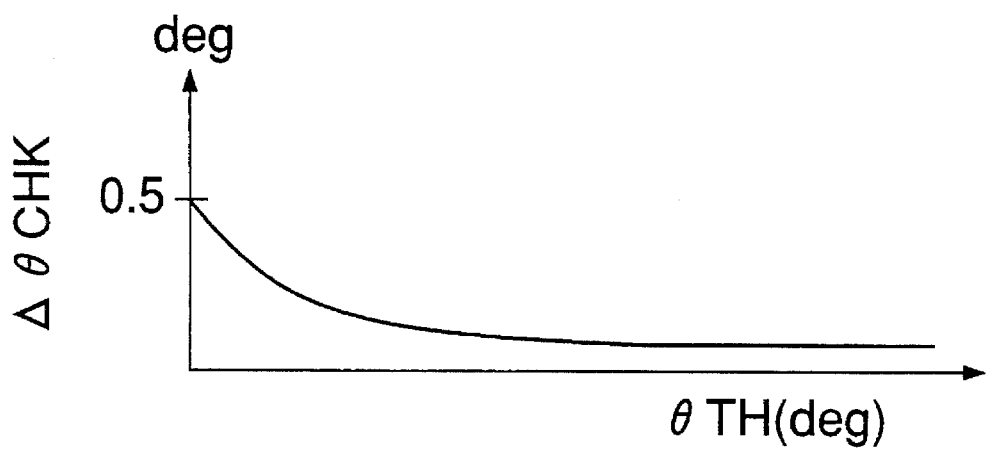
FIG. 23 is a graph showing the relationship between the throttle valve opening θTH and a predetermined reference value Δ θCHK for determining a steady operating condition of the engine.
Figure 25:
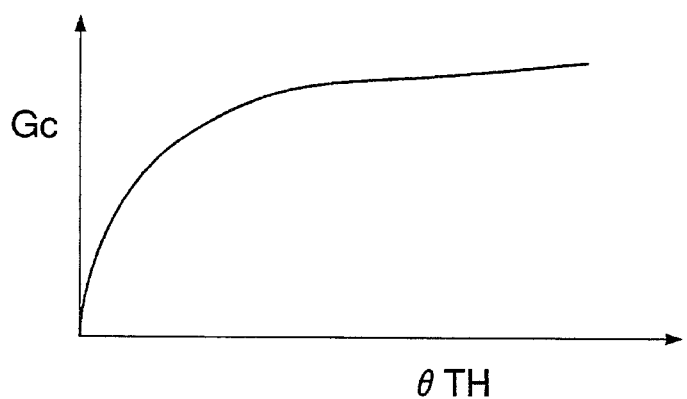
FIG. 25 is a graph showing the relationship between the throttle valve opening θTH and the intake air amount Gc.
Figure 26:
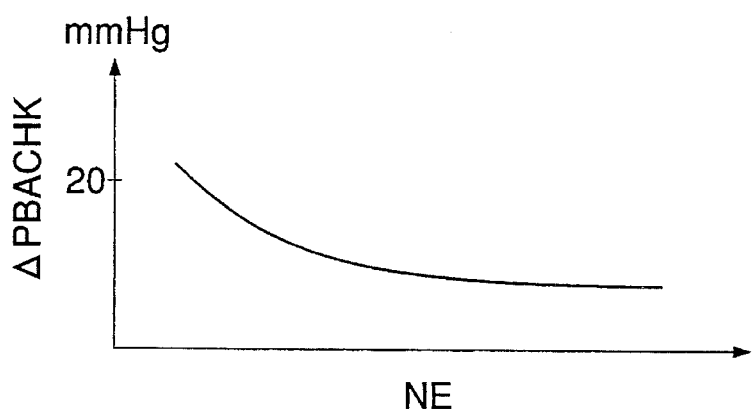
FIG. 26 is a graph showing the relationship between the engine rotational speed NE and the predetermined reference value Δ θCHK.

In this routine, the program proceeds from the step S80 to the step S90, wherein it is determined whether or not the engine is in a steady operating condition. The manner of determining the steady operating condition will be described with reference to 20 FIG. 22 showing a subroutine therefor. First, at a step S91, an amount of change $\Delta \theta TH$ of the throttle valve opening $\theta TH$ is calculated by subtracting the immediately preceding value $\theta TH(k-1)$ of the throttle valve opening $\theta TH$ detected at the time of generation of the immediately preceding TDC signal pulse from the present value (k) of the same detected at the time of generation of the present TDC signal pulse. Then, it is determined at a step S 92 whether or not the absolute value of the amount of change $\Delta \theta TH$ is equal to or smaller than a predetermined reference value $\Delta \theta CHK$. If the former is equal to or smaller than the latter, it is judged that the engine is determined to be in a steady operating condition, whereas if the former exceeds the latter, it is judged that the engine is determined to be in a transient operating condition. In this connection, the throttle valve opening $\theta TH$ and the intake air amount (amount of air drawn into the cylinder) Gc are in the relationship as shown in FIG. 25. In view of this relationship, desirably, the predetermined reference value $\Delta \theta CHK$ should be set to e.g. approximately 0.5 degrees on the small valve opening side. More preferably, as shown in FIG. 23, the predetermined reference value $\Delta \theta CHK$ should be set according to the throttle valve opening $\theta TH$. To this end, the predetermined reference value $\Delta \theta CHK$ is retrieved from a map which contains map values set in advance according to the throttle valve opening $\theta TH$ and is stored in the ROM 58, for retrieval according to the detected value of throttle valve opening $\theta TH$.

Next, when the engine is determined to be in a transient operating condition at the step S90, the Timap (Gc') value read at the step S40 is multiplied by the ratio RATIO-A determined at the step S80 to calculate the fuel injection amount Tout (Gc) corresponding to the amount of air flowing through the throttle valve at the step S120.

On the other hand, if the engine is determined to be in a steady operating condition at the step S90, the ratio RATIO-A determined at the step S80 is set to a predetermined value of "1.00" by the holding block 101 at a step S100, and then the fuel injection amount Tout (Gc) is calculated at the step S120 by the use of the predetermined value as the ratio RATIO-A set at the step S100. As a result, the calculated value of the fuel injection amount Tout (Gc) becomes equal to the value Timap (Gc').

Thus, when the amount of change $\Delta \theta TH$ falls within a predetermined small range, arithmetic operations for the fuel injection amount control are executed under the assumption that the engine is operating in a steady operating condition, whereby it is possible to eliminate the influence of noise, etc., thereby enable more stable and accurate estimation of the intake air amount.

Although in the present embodiment, whether the engine is in a steady operating condition is determined based on the amount of change $\Delta \theta TH$ in the throttle valve $\theta TH$, this is not limitative, but it is also possible to carry out the determination in the following manners, for example:

For example, a steady operating condition of the engine may be determined based on the ratio RATIO-A of the effective opening area determined at the step S80. In this case, if the ratio RATIO-A assumes a value of "1.00", which means that the effective opening area A of the throttle valve is equal to the first-order delay value thereof, it can be judged that the engine is in a steady operating condition. In addition, in view of the influence of noise caused by vibrations of the engine and the like, it may be determined that the engine is in a steady operating condition if the ratio RATIO-A fall within a range of e.g. 0.95 to 1.05. Therefore, if the ratio RATIO-A is within this range, it is judged at the step S90 that the engine is in a steady operating condition, and then the ratio RATIO-A is updated to or set to the predetermined value 1.00 of at the step S100.

Figure 24:
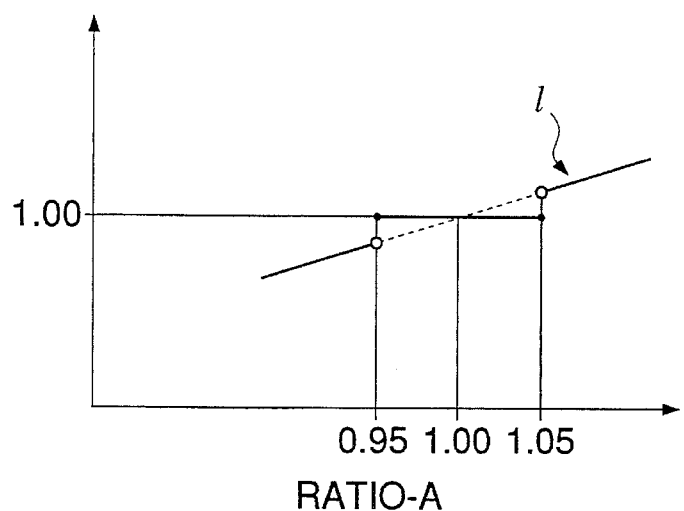
FIG. 24 is a graph applied in converting a RATIO-A value to a predetermined value.

This setting may be carried out by the use of a characteristic curve 1 in FIG. 24 according to which the ratio RATIO-A is set to the predetermined value.

Although the above described manners of determining a steady operating condition of the engine are all based on the detected value of the throttle valve opening $\theta TH$, this is not limitative, but the intake air pressure PBA may be used in determination of a steady operating condition of the engine. More specifically, the intake pipe absolute pressure PBA is detected in synchronism with generation of each TDC signal pulse, and if the absolute value of the difference between the present value and the immediately preceding value of the intake pipe absolute pressure PBA is below a predetermined reference value ΔPBACHK, it is judged that the engine is in a steady operating condition.

It is desirable that the predetermined reference value ΔPBACHK is also set according to the engine rotational speed NE. For example, when the engine is idling, if the variation in the intake pipe absolute pressure PBA falls within a range of +20 mmHg, it is determined that the engine is in a steady operating condition (the answer to the question of the step S90 is affirmative (YES)), and the ratio RATIO-A is updated to "1.00" at the step S100.

In this manner of determination, it is desirable that the predetermined reference value ΔPBACHK is determined by retrieving a ΔPBACHK map which contains map values set in advance according to the engine rotational speed NE and is stored in the ROM 58, for reading according to the detected value of the engine rotational speed NE.

Although in the present embodiment, the holding block 101 sets and holds the ratio RATIO-A of the effective opening area of the throttle valve to and at the predetermined value of "1.00" when the engine is in a steady operating condition, this is not limitative, but it may be set to any desired value close to 1.00, such as "1.02".

Although in the above described embodiments and variation, the Ti map containing map values Timap of the fuel injection amount is prepared in advance, this is not limitative, but instead, a Gc' map containing map values of the intake air amount Gc' may be prepared and stored in the ROM 58.

Further, although in the above described embodiments and variation, the fuel injection amount is determined in a manner corresponding to the estimated intake air amount, this is not limitative, but the ignition timing, the exhaust gas recirculation (EGR) amount, or other engine control parameters may be calculated in a manner corresponding to the estimated intake air amount.

What is claimed is:

1. An intake air amount-estimating apparatus for an internal combustion engine having an intake passage, a throttle valve arranged in said intake passage, and at least one combustion chamber, said intake air amount-estimating device estimating an amount Gc of intake air actually drawn into each of said at least one combustion chamber of said engine, based on a model formulated on said intake passage in which a portion of said intake passage extending from said throttle valve to said each of said at least one combustion chamber is regarded as a chamber, said intake air amount-estimating apparatus comprising:

operating condition-detecting means for detecting operating parameters of said engine including rotational speed of said engine, a degree of opening of said throttle valve, and pressure within said chamber;

intake air amount value-determining means for determining a value GC' of said amount of intake air in a steady operating condition of said engine, at least based on said rotational speed of said engine and said pressure within said chamber detected by said operating condition-detecting means;

effective opening area-determining means for determining an effective opening area A of said throttle valve, at least based on said degree of opening of said throttle valve and said pressure within said chamber detected by said operating condition-detecting means;

first-order delay value-determining means for determining a first-order delay value ADELAY of said effective opening area of said throttle valve; and intake air amount value-correcting means for correcting said value Gc' of said amount of intake air in said steady operating condition of said engine by a ratio of said effective opening area A of said throttle valve to said first-order delay value ADELAY of said effective opening area of said throttle valve by the use of the following equation:

$$Gc=Gc'\times(A/ADELAY)$$

to thereby calculate said amount Gc of intake air actually drawn into said combustion chamber, wherein said first-order delay value-calculating means comprises:

change-detecting means for detecting a change in an amount of air charged in said chamber;

setting means for setting a correction value for use in calculating a first-order delay value of said degree of opening of said throttle valve, in a manner depending on said change in said amount of air charged in said chamber detected by said change-detecting means; and calculating means for calculating said first-order delay value of said effective opening area by the use of said correction value set by said setting means.

2. An intake air amount-estimating apparatus according to claim 1, wherein said setting means sets said correction value in manners depending on whether said amount of air charged in said chamber increases or decreases.

3. An intake air amount-estimating apparatus according to claim 1, wherein said setting means sets, as said correction value, a correction coefficient B for determining a first-order transfer function of said degree of opening of said throttle valve, depending on said direction of said change in said amount of air charged in said chamber, said calculating means setting said first-order transfer function based on said correction coefficient B set by said setting means, calculating said first-order delay value of said degree of opening of said throttle valve based on the set first-order transfer function, and calculating said first-order delay value ADELAY of said effective opening area based on the calculated first-order delay value of said degree of opening of said throttle valve and said pressure within said chamber.

4. An intake air amount-estimating apparatus according to claim 3, wherein said change-detecting means detects said change in said amount of air charged in said chamber from a change in said degree of opening of said throttle valve, said setting means setting said correction coefficient to different values depending on whether said amount of air charged in said chamber increases or decreases.

5. An intake air amount-estimating apparatus according to claim 1, wherein said engine has intake valves and exhaust valves, said intake passage having an intake manifold, said change-detecting means detecting said change in said amount of air charged in said chamber based on at least one of a change in a volume of said intake manifold, a change in valve timing of at least one of said intake valves and said exhaust valves of said engine, a change in atmospheric pressure, a change in a desired air-fuel ratio to which an air-fuel ratio of a mixture supplied to said engine is controlled.

6. An intake air amount-estimating apparatus according to claim 4, wherein said engine has intake valves and exhaust valves, said operating condition-detecting means also detecting valve timing of at least one of said intake valves and said exhaust valves of said engine, atmospheric pressure, intake air temperature, and a desired air-fuel ratio to which an air-fuel ratio of a mixture supplied to said engine is controlled, said setting means setting said correction coefficient to different values further depending on said valve timing, and correcting said correction coefficient according to at least one of said valve timing of said intake valves and said exhaust valves of said engine, said atmospheric pressure, said intake air temperature, and said desired air-fuel ratio.

7. An intake air amount-estimating apparatus for an internal combustion engine having an intake passage, a throttle valve arranged in said intake passage, and at least one combustion chamber, said intake air amount-estimating apparatus estimating an amount Gc of intake air actually drawn into each of said at least one combustion chamber of said engine, based on a model formulated on said intake passage in which a portion of said intake passage extending from said throttle valve to each of said at least one combustion chamber is regarded as a chamber, said intake air amount-estimating apparatus comprising:

operating condition-detecting means for detecting operating parameters of said engine including rotational speed of said engine, a degree of opening of said throttle valve, and pressure within said chamber;

intake air amount value-determining means for determining a value Gc' of said amount of intake air in a steady operating condition of said engine, at least based on said rotational speed of said engine and said pressure within said chamber detected by said operating condition-detecting means;

effective opening area-determining means for determining an effective opening area A of said throttle valve, at least based on said degree of opening of said throttle valve and said pressure within said chamber detected by said operating condition-detecting means;

first-order delay value-determining means for determining a first-order delay value ADELAY of said effective opening area of said throttle valve;

effective opening area ratio-determining means for determining a ratio of said effective opening area A to said first-order delay value ADELAY of said effective opening area, as an effective opening area ratio RATIO-A;

intake air amount value-correcting means for correcting said value Gc' of said amount of intake air in said steady operating condition of said engine by multiplying said value Gc' of said amount of intake air by said effective opening area ratio RATIO-A by the use of the following equation:

$$Gc = Gc' \times RATIO\text{-}A$$

to thereby calculate said amount Gc of intake air actually drawn into said combustion chamber;

steady operating condition-determining means for determining whether said engine is in said steady operating condition; and changing means for changing said effective opening area ratio RATIO to a predetermined value when said steady operating condition-determining means determines that said engine is in said steady operating condition.

8. An intake air amount-estimating apparatus according to claim 7, wherein said steady operating condition-determining means determines that said engine is in said steady operating condition when an amount of change in said degree of opening of said throttle valve per a predetermined time period is within a predetermined range.

9. An intake air amount-estimating apparatus according to claim 8, wherein said predetermined range of said amount of change in said degree of opening of said throttle valve is set according to said degree of opening of said throttle valve.

10. An intake air amount-estimating apparatus according to claim 7, wherein said steady operating condition-determining means determines that said engine is in said steady operating condition when said effective opening area ratio RATIO-A is within a predetermined range close or equal to 1.0.

11. An intake air amount-estimating apparatus according to claim 7, wherein said steady operating condition-determining means determines that said engine is in said steady operating condition when an amount of change in said pressure within said chamber per a predetermined time period is within a predetermined range.

12. An intake air amount-estimating apparatus according to claim 11, wherein said predetermined range of said amount of change in said pressure within said chamber is set according to said rotational speed of said engine.

* * * * *